US006292607B1

(12) United States Patent
Ishikawa et al.

(10) Patent No.: US 6,292,607 B1
(45) Date of Patent: *Sep. 18, 2001

(54) METHOD FOR DETERMINING AN AGING CONDITION FOR AN OPTICAL WAVEGUIDE GRATING AND TEMPERATURE SENSOR

(75) Inventors: Shinji Ishikawa; Toru Iwashima; Michiko Takushima (nee Harumoto); Akira Inoue; Masakazu Shigehara, all of Yokohama (JP)

(73) Assignee: Sumitomo Electric Industries, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/343,472

(22) Filed: Jun. 30, 1999

Related U.S. Application Data

(63) Continuation-in-part of application No. 09/070,799, filed on May 1, 1998, now Pat. No. 6,137,931.

(30) Foreign Application Priority Data

May 1, 1997 (JP) .................................................. 9-113996
Apr. 24, 1998 (JP) ................................................ 10-114839
Sep. 11, 1998 (JP) ................................................ 10-258291

(51) Int. Cl.⁷ ..................................................... G02B 6/34
(52) U.S. Cl. ............................ 385/37; 359/570; 65/17.1; 65/29.18
(58) Field of Search ........................... 385/37, 123, 124; 359/566, 570; 65/17.1, 29.18, 384, 425

(56) References Cited

U.S. PATENT DOCUMENTS

| 4,703,175 | * | 10/1987 | Salour et al. ......................... 356/45 |
| 5,287,427 | | 2/1994 | Atkins et al. ........................ 385/124 |
| 5,620,496 | | 4/1997 | Erdogan et al. ....................... 65/425 |
| 5,646,401 | * | 7/1997 | Udd .................................. 250/227.19 |

* cited by examiner

Primary Examiner—Darren Schuberg
(74) Attorney, Agent, or Firm—Pillsbury Winthrop LLP

(57) ABSTRACT

The present invention provides a method for determining a condition of aging for an optical waveguide grating. In this method, the aged deterioration curve of the optical waveguide grating is set as a form of $C \cdot t^{-\alpha}$, where t represents time, and $\alpha$ and C represent parameters. Then, the condition of the aging is determined based on the aged deterioration curve.

18 Claims, 15 Drawing Sheets

| Temp (°C) | Temp (K) | 1/T (1/K) | α | C |
|---|---|---|---|---|
| 75 | 348 | 0.00287 | 0.0095 | 1.0807 |
| 85 | 358 | 0.00279 | 0.0131 | 1.1059 |
| 100 | 373 | 0.00268 | 0.0118 | 1.0017 |
| 120 | 393 | 0.00254 | 0.0199 | 1.0243 |
| 170 | 443 | 0.00226 | 0.0381 | 1.0371 |
| 220 | 493 | 0.00203 | 0.0522 | 0.9941 |
| 280 | 553 | 0.00181 | 0.0747 | 1.0115 |

Fig.4

METHOD FOR DETERMINING AN AGING CONDITION FOR AN OPTICAL WAVEGUIDE GRATING AND TEMPERATURE SENSOR

RELATED APPLICATION

This a continuation-in-part application of U.S. patent application Ser. No. 09/070,799 filed on May 1, 1998, now U.S. Pat. No. 6,137,931.

BACKGROUND OF THE INVENTION

1. Field of the Invention

The present invention relates to aging of a grating built in an optical waveguide, and more particularly to aging of a grating used as a filter, multi/demultiplexer, dispersion-compensator, and the like in an optical fiber network. The present invention also relates to a temperature sensor including an optical waveguide grating as a sensing section.

2. Related Background Art

An optical waveguide type grating, which is typified by an optical fiber grating, is a region in an optical waveguide such as an optical fiber (mostly in its core portion) in which a periodic change of refractive index along the longitudinal direction of the waveguide occurs. The region where the refractive index changes can transmit or reflect propagated light depending on its wavelength. In particular, a Bragg grating generates reflected light with a narrow wavelength band centered on its Bragg wavelength. The optical waveguide grating is applied to various optical elements such as filters, multi/demultiplexers, dispersion-compensators, and the like.

FIG. 1 is a view showing a typical method for producing an optical waveguide grating. As shown in FIG. 1, a grating 20 is often formed by a method comprising preparing a silica-based optical fiber 10 in which $GeO_2$ (germanium dioxide) is added to at least its core region; irradiating this optical fiber 10 with an interference fringe formed by light rays 30 having a predetermined wavelength; and generating a change in refractive index independent on the optical energy intensity distribution of this interference fringe. Since the optical fiber 10 is usually coated with a plastic layer (not shown), a part of the coating is removed, and thus exposed part of the optical fiber 10 is irradiated with the light rays 30. It has been considered that the irradiation with a certain wavelength of light generates Ge-defects in the $GeO_x$-doped portion in the silica-based optical waveguide, thereby causing the change in refractive index. In FIG. 1, numeral 22 indicates parts where a larger amount of increase in refractive index is induced upon the irradiation, whereas numeral 24 indicates parts where a smaller amount of increase in refractive index is induced. The grating 20 may be considered to be a region where the parts 22 and 24 are alternatively and periodically disposed along the longitudinal direction of the optical fiber 10.

An optical waveguide grating may be used as a temperature sensor also. The temperature sensor comprises an optical waveguide grating as a sensing section, and measures temperature utilizing the temperature dependence of the Bragg wavelength. More particularly, in the measurement of temperature, the sensor measures the Bragg wavelength and compares the measured value with the temperature dependence of the Bragg wavelength previously measured to determine the temperature.

As is previously known, the characteristics of an optical waveguide grating change over time because the number of Ge-defects generated by the irradiation of light changes over time. This has been known as aged deterioration of an optical waveguide grating. With respect to a Bragg grating, the Bragg wavelength at any temperature changes (usually decreases) over time. It means that the operating characteristics of a temperature sensor comprising an optical waveguide Bragg grating as its sensing section change over time. For example, if such a temporal change is relatively rapid, different Bragg wavelengths are measured for the same temperature one month and three months after beginning to use the temperature sensor, and thus different temperatures will be determined at different points in time. In view of the foregoing, there have been proposed techniques which perform accelerated aging for an optical waveguide grating immediately after its manufacture to sufficiently suppress its aged deterioration upon operation in the market. Examples of such techniques are disclosed in U.S. Pat. Nos. 5,287,427 and 5,620,496 which are incorporated herein by reference.

In the technique disclosed in U.S. Pat. No. 5,620,496, normalized refractive index difference η is supposed to be represented by the following relational expression:

$$\eta = \frac{1}{1 + C \cdot t^\alpha} \quad (1)$$

where t represents time, and C and α are functions of temperature. The normalized refractive index difference η is a value of the refractive index difference of a grating when time t has elapsed from a predetermined point of time (i.e., reference time) after formation of the grating, and this value is normalized with respect to the refractive index difference of the grating at this point of time. Namely, η=(refractive index difference at t after the reference time)/(refractive index difference at the reference time). In the technique disclosed in the above patent, the time immediately after formation of a grating is adopted as the reference time. The refractive index difference refers to the difference between the maximum and minimum values of the refractive index in a grating.

In the conventional techniques, from the fact that η changes more rapidly as temperature is higher, the optical fiber grating is heat-treated in an environment with temperature higher than its operating temperature to perform the accelerated aging, in order to suppress the deterioration upon its operation.

SUMMARY OF THE INVENTION

Having studied the conventional techniques mentioned above, the inventors have found the following problems. Namely, in the above-mentioned conventional techniques, since expression (1) which represents the temporal change in normalized refractive index difference η has the relatively complicated form and the two parameters of C and α depend on temperature, it is difficult to determine the temperature and time of the heat treatment for the aging. In effect, the above-mentioned patents do not fully disclose such conditions of the aging.

It is an object of the present invention to provide a method by which a condition of aging may be determined more easily.

More specifically, the method in accordance with the present invention comprises setting the aged deterioration curve of an optical waveguide grating as a form of $C \cdot t^{-\alpha}$, where t represents time, and C and α represent parameters; and a step of determining a condition of aging according to said aged deterioration curve. The aging condition can be determined more easily because the form of the aged deterioration curve that is proportional to $t^{-\alpha}$ is simpler than that in the prior art. Parameter a may be represented as follows:

$$\alpha = \alpha 0 \cdot \exp(-E_\alpha/T)$$

where $\alpha 0$ and $E_\alpha$ are constants, and T is absolute temperature. Since these expressions can represent aged deterioration of an optical waveguide grating with sufficient accuracy, these expressions may be used to determine an aging condition adequately.

Parameter C may be represented as follows:

$$C = \tau^\alpha = [\tau 0 \cdot \exp(-E_\tau/T)]^\alpha$$

where $\tau 0$ and $E_\tau$ are constants, and T is absolute temperature. This expression provides a good representation of aged deterioration of an optical waveguide grating at high temperature. Therefore, the expression may be used to determine an aging condition for an optical waveguide grating adequately even if the grating is used in relatively high temperature environment.

In one embodiment, parameter C may be regarded as a constant. In this case, the expression of the aged deterioration curve may include only one parameter dependent on temperature, i.e., $\alpha$, and thus the aging condition can be determined still more easily.

Further, in one embodiment, the value η1 of the normalized refractive index difference at the completion of the aging may be determined as the aging condition. The temperature T1 and time t1 of the heat treatment for the aging can be determined from the value η1.

Another aspect of the present invention includes a method for making an optical waveguide with a grating which is designed to suppress its deterioration within a predetermined tolerance when the grating is used for an operating time of t3 at an operating temperature of T2. This method comprises a step of forming a grating in a region in an optical waveguide; and a step of aging the grating under an aging condition determined by the above-mentioned determining method. In one embodiment, the aging may be effected by heat-treating the grating until the normalized refractive index difference η of the grating reaches the above value η1.

Another object of the invention is to provide a temperature sensor with operational stability over a long period of time by suppressing time-dependent changes in its operating characteristics.

A temperature sensor in accordance with the invention has an operating temperature range, a guaranteed operating time and a temperature resolution, and comprises an optical waveguide grating as a sensing section. The grating has been subjected to accelerated aging under a predetermined condition. The condition of the aging is determined to provide a displacement of a measured temperature value due to aged deterioration of the grating that is no greater than the temperature resolution when the sensor is used for the guaranteed operating time at the maximum temperature in the operating temperature range. In the temperature sensor in accordance with the invention, since the optical waveguide grating subjected to accelerated aging under such a condition is used as the sensing section, variations in the operating characteristics due to the aged deterioration of the grating may be sufficiently suppressed.

In one embodiment, the aging condition may be determined using the aged deterioration curve of the grating represented as said form of $C \cdot t^{-\alpha}$, where t represents time, and C and $\alpha$ represent parameters.

The optical waveguide in the sensor in accordance with the invention may have the surface subjected to etching after the accelerated aging. Since the etching may eliminate a scratch on the surface of the waveguide, a risk of breakage of the waveguide due to thermal deformation may be decreased when the sensor is placed in an environment with varying temperature.

The optical waveguide in the sensor may have a heat-resisting coating as its surface. The temperature sensor with such a waveguide may function well at relatively high temperatures.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 4 is a table showing parameters C and α concerning the fitting curves shown in FIGS. 2 and 3 with respect to each temperature;

DESCRIPTION OF THE PREFERRED EMBODIMENTS

In the following, several embodiments of the present invention will be explained in detail with reference to the accompanying drawings. Before explaining a method for making an optical waveguide with a built-in grating, a method for predicting aged deterioration of the grating and determining a condition of aging process will be explained.

In the present invention, the following expression is employed as a expression representing temporal change of normalized refractive index difference $\eta$ of a grating:

$$\eta = C \cdot T^{-\alpha} \qquad (2)$$

where t represents time, and C and $\alpha$ are parameters. This expression (2) can represent aged deterioration of normalized refractive index difference $\eta$ with adequate accuracy, as will be explained in greater detail in the following.

In general, normalized refractive index difference $\eta$ represents a value of the refractive index difference of a grating when time t has elapsed from a predetermined point of time (i.e., reference time) after formation of the grating. This value is normalized with respect to the refraxtive index difference of the grating at this point of time. Namely, $\eta$=(refractive infex dofferemce aat t after tje reference time)/(refractive infex differenxce at the reference time). Here, the refractive index difference refers to the difference between the mazimum and minimum values of refractive index in the grating. In most cases, temporal change of the refractive index difference is measured at a suffciently short interval after the grating has been formed, and the measured refractive index difference may be considered to be equal to the refractive index difference at the time the formation of the grating was completed. Accordingly, normalized refractive index difference $\eta$ with respect to the above measured refractive index difference can be considered as representing a ratio of the refractive index difference at t after the completion of the formation of the grating to the refractive index difference at the completion of the formation of the grating.

Figure 1:
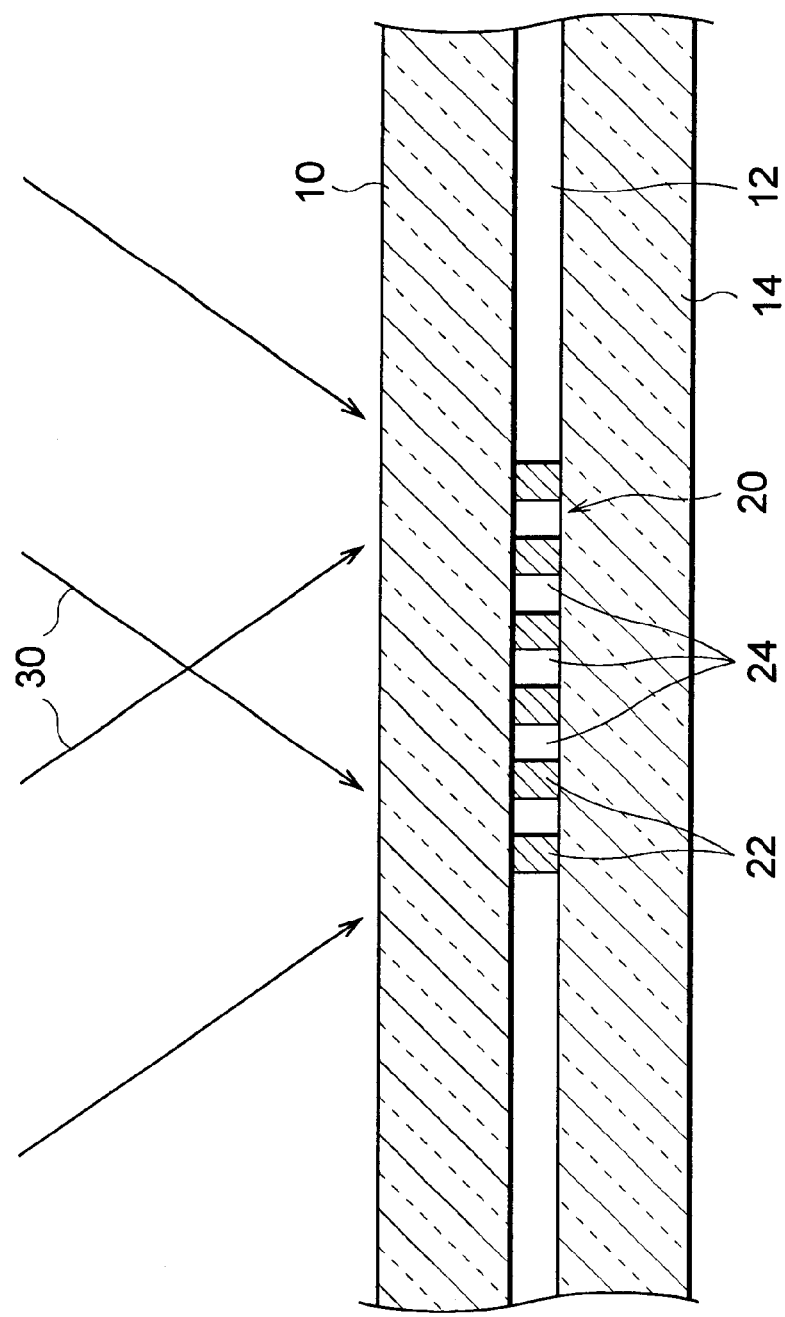
FIG. 1 is a view showing a method for photowriting a grating into an optical fiber.
Figure 2:
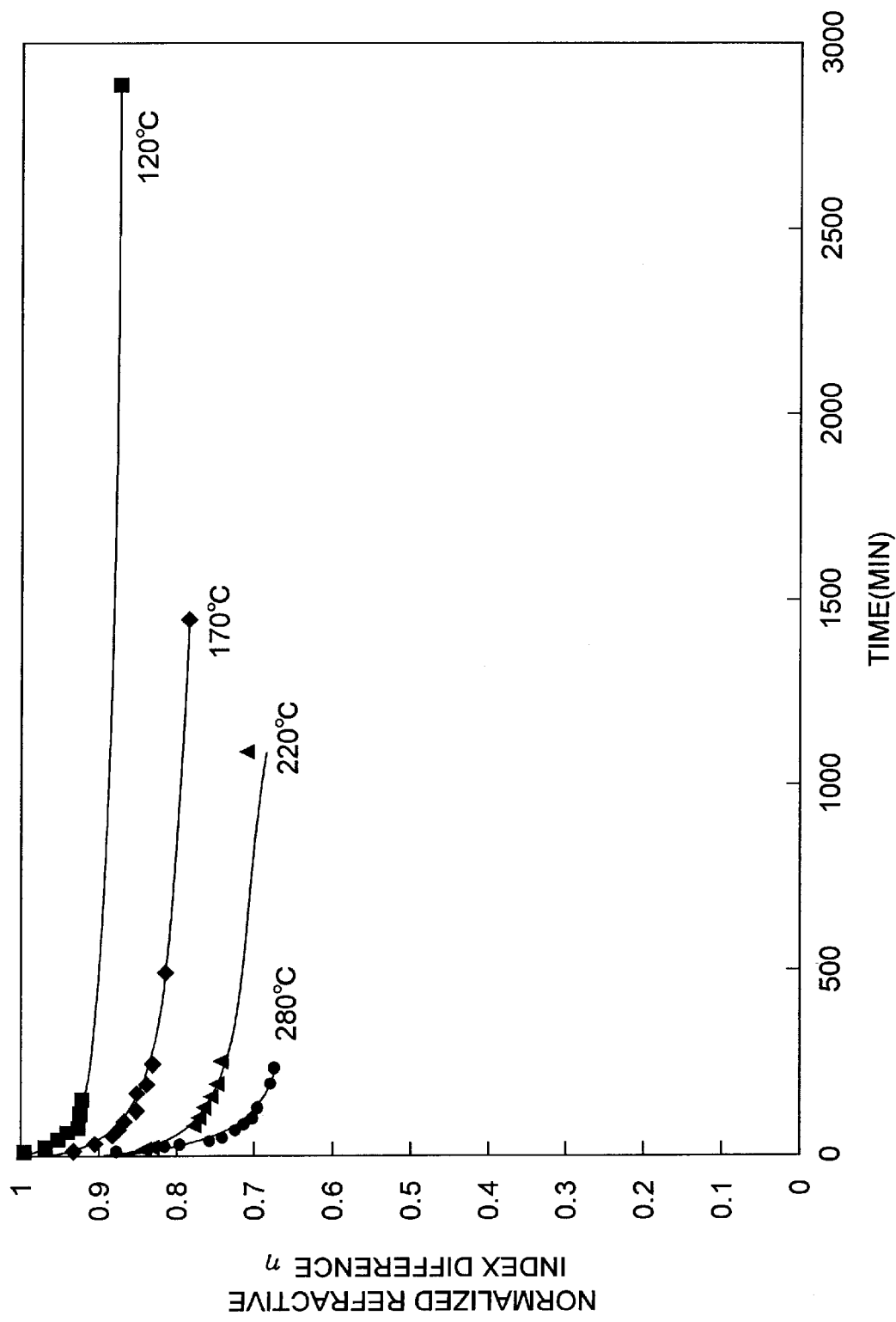
FIG. 2 is a graph showing aged deterioration of normalized refractive index difference η of a grating at each temperature of 120° C., 170° C., 220° C., and 280° C.
Figure 3:
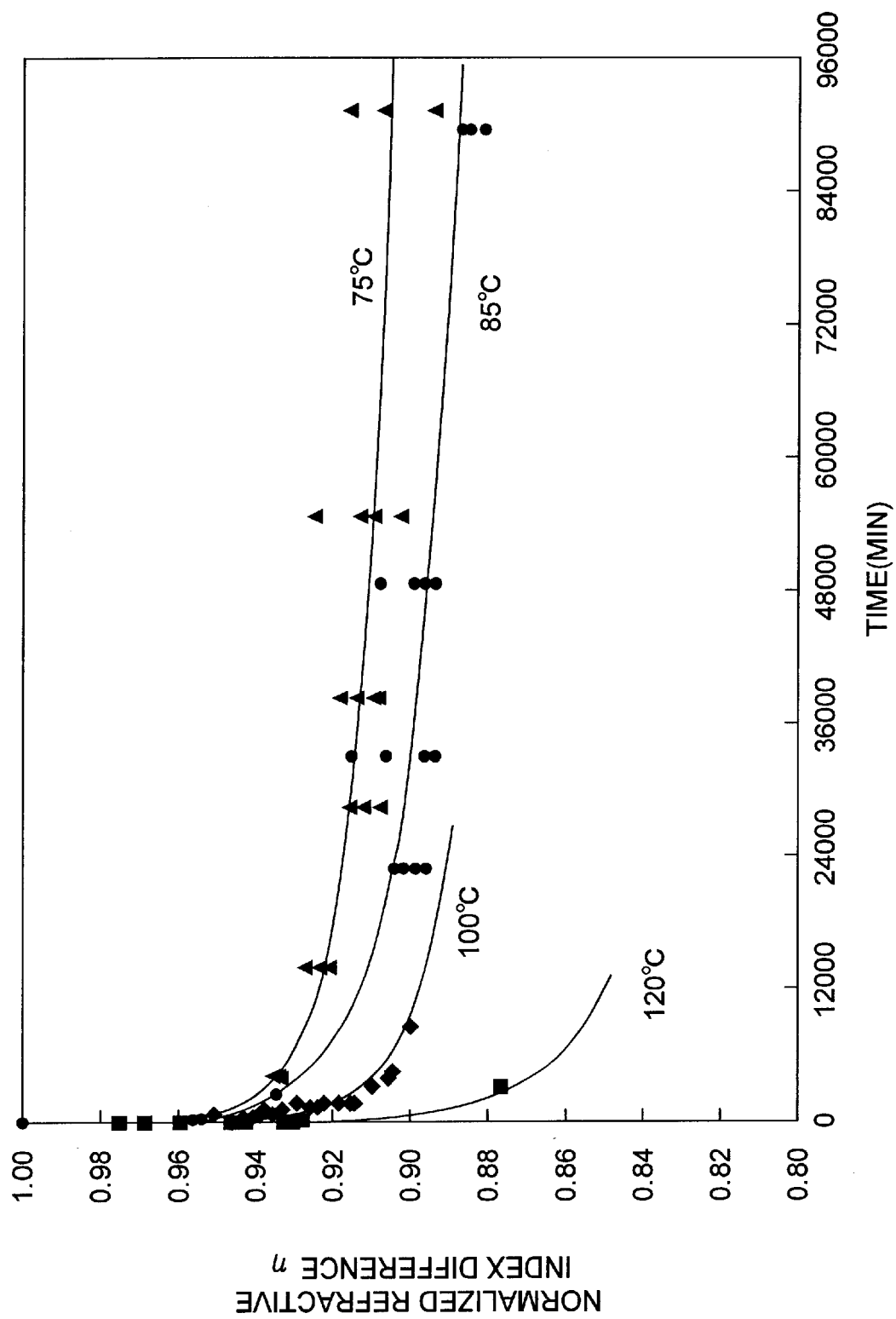
FIG. 3 is a graph showing aged deterioration of normalized refractive index difference η of a grating at each temperature of 75° C., 85° C., 100° C., and 120° C.

FIGS. 2 and 3 are graphs showing measured values of normalized refractive index difference $\eta$ of a grating at various temperatures, as well as curves fitting these measured values according to expression (2). The grating used for this measurement was photowritten into a silica-based optical fiber, which has a core doped with $GeO_2$, by irradiating the optical fiber with ultraviolet light, as shown in FIG. 1.

Specifically, FIG. 2 shows aged deterioration of normalized refractive index difference $\eta$ of the grating at each temperature of 120° C., 170° C., 220° C., and 280° C., and FIG. 3 shows aged deterioration of $\eta$ of the grating at each temperature of 75° C., 85° C., 100° C., and 120° C. over a longer period of time. In these graphs, the plotted points indicate the measured values of $\eta$ whereas the solid lines are curves fitting these measured values according to expression (2). Here, $\eta$ can be determined by normalizing refractive index difference $\Delta n$ of the grating with respect to refractive index difference $\Delta n0$ that is measured after photowriting the grating before heating the grating to the above-mentioned temperatures. Namely:

$$\eta = \frac{\Delta n}{\Delta n0} \qquad (3)$$

As shown in these graphs, the measured values and the fitting curves correspond to each other very well. In particular, when temperature is 100° C. or higher, the correlation coefficient between the measured values and the curves of expression (2) is 0.94 or higher, thus yielding favorable results. Thus, temperature dependence and time dependence of normalized refractive index difference $\eta$ may be represented appropriately by expression (2).

FIG. 4 is a table showing parameters C and $\alpha$ with respect to the fitting curves shown in FIGS. 2 and 3 for each temperature. The columns of this table successively indicate centigrade temperature, absolute temperature, reciprocal of absolute temperature, parameter $\alpha$ and parameter C. As shown in this table, parameter C can be regarded as a constant value (about 1, in this embodiment) independent of temperature.

Figure 5:
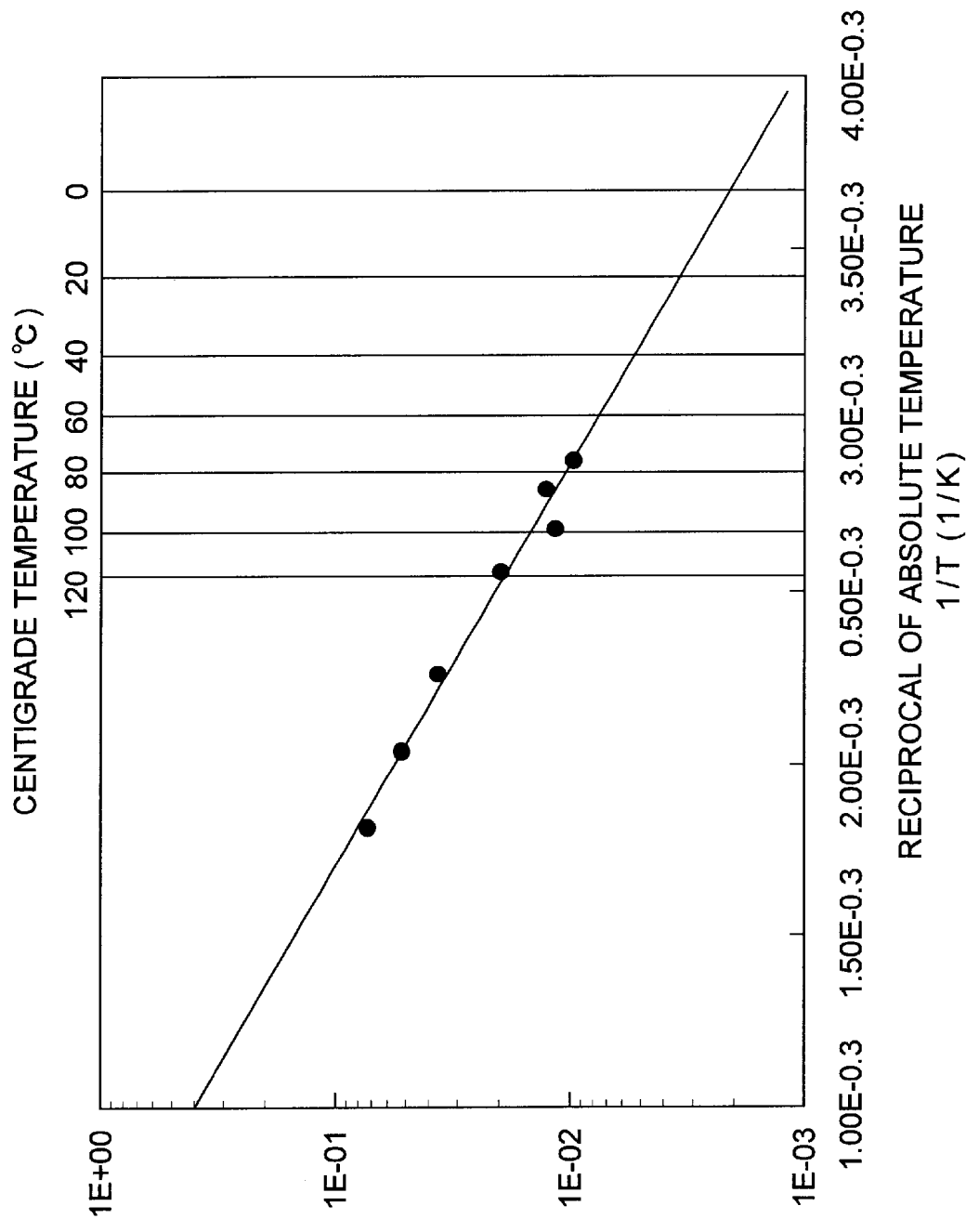
FIG. 5 is a graph showing the relationship between parameter α and temperature.

In the following, temperature dependence of parameter $\alpha$ will be explained. FIG. 5 is a graph showing the relationship between parameter $\alpha$ and absolute temperature T; this relationship was determined by the above-mentioned measurements. In this graph, the ordinate logarithmically indicates parameter $\alpha$, whereas the abscissa indicates reciprocal of absolute temperature T, i.e., 1/T. For reference, the upper scale of this graph shows centigrade temperature as well. As this graph shows, parameter $\alpha$ conforms well to Arrhenius' law with respect to absolute temperature T. Consequently, parameter $\alpha$ can be approximately represented by the following general expression:

$$\alpha = \alpha 0 \cdot \exp(-E_\alpha/T) \qquad (4)$$

where $\alpha 0$ and $E_\alpha$ are constants independent of temperature. According to the results of the above-mentioned measurements, $\alpha 0$ and $E_\alpha$ are 2.7914 and 1963.2, respectively. Therefore, an activation energy of 16.32 kJ/mol is obtained.

Figure 6:
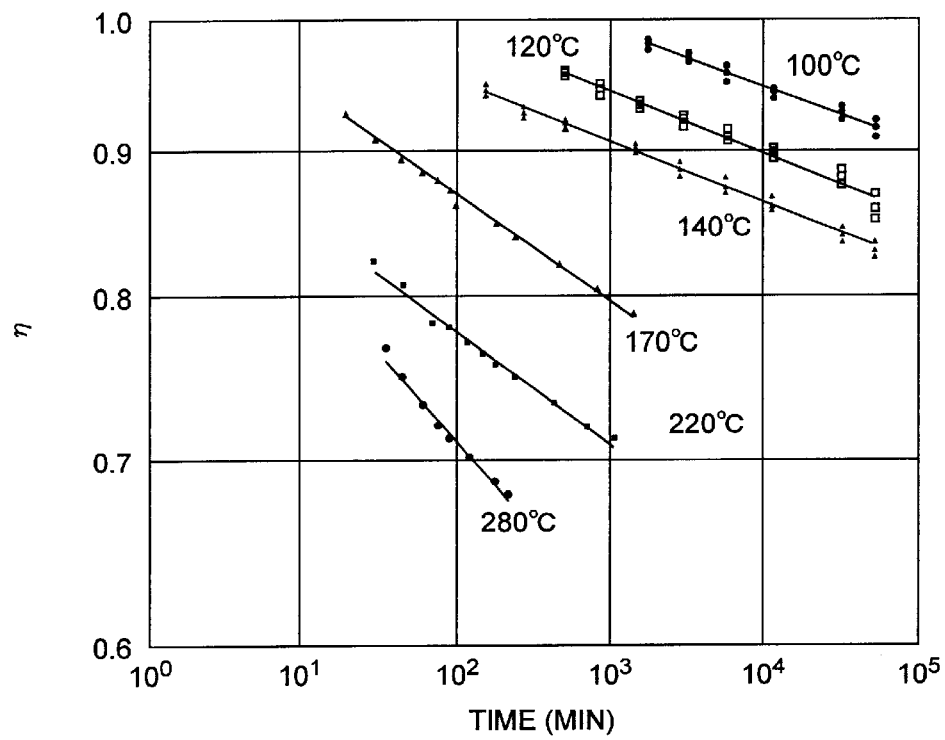
FIG. 6 is a graph showing aged deterioration of normalized refractive index difference η of a grating at each temperature of 100° C., 120° C., 140° C., 170° C., 220° C., and 280° C.
Figure 7:
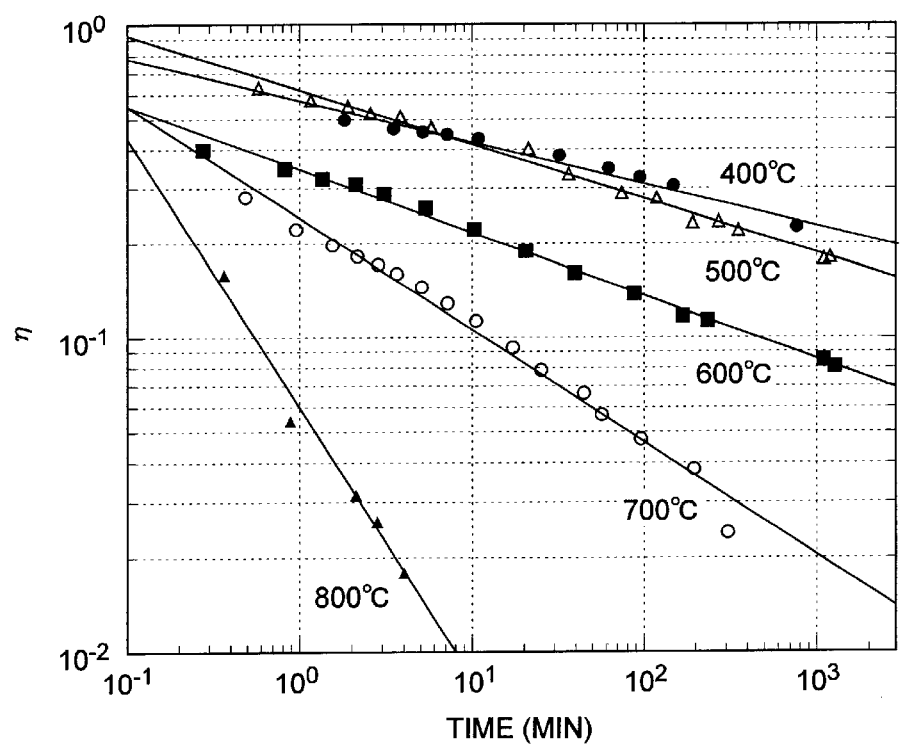
FIG. 7 is a graph showing aged deterioration of normalized refractive index difference η of a grating at each temperature of 400° C., 500° C., 600° C., 700° C., and 800° C.

FIGS. 6 and 7 are graphs showing temporal changes in normalized refractive index difference $\eta$ of the grating measured over temperature ranges wider than those shown in FIGS. 2 and 3. Specifically, FIG. 6 shows aged deterioration of normalized refractive index difference $\eta$ of the grating at each temperature of 100° C., 120° C., 140° C., 170° C., 220° C., and 280° C., and FIG. 7 shows aged deterioration of $\eta$ of the grating at each temperature of 400° C., 500° C., 600° C., 700° C., and 800° C. In these graphs, the plotted points indicate the measured values of $\eta$, whereas the solid lines are fitted to these measured values according to expression (2). Since the ordinate and abscissa in each of FIGS. 6 and 7 are logarithmically indicated, the lines fitting the measured values are linear.

Figure 8:
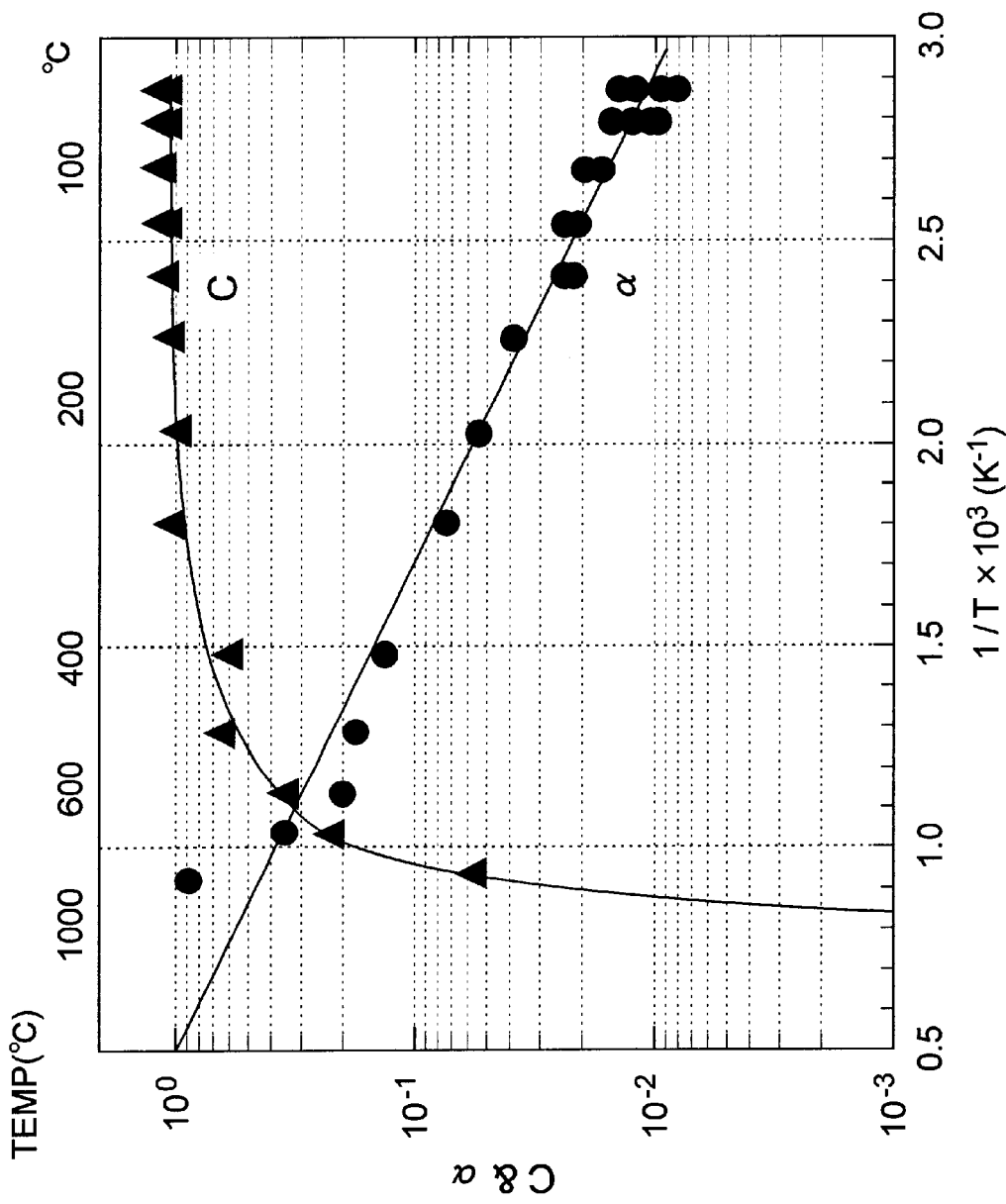
FIG. 8 is a graph showing the relationships between temperature and parameters C and α concerning the fitting curves shown in FIGS. 6 and 7.

FIG. 8 is a graph showing the relationships between temperature T and parameters C and $\alpha$ corresponding to the fitting lines in FIGS. 6 and 7. As shown in this graph, when temperature is about 300° C. or lower, parameter C is substantially independent of temperature and approximately equals to 1. Also, $\alpha$ conforms well to Arrhenius' law with respect to absolute temperature T and can be represented by the above-mentioned expression (4). According to the measured values in FIGS. 6 and 7, α0 and $E^\alpha$ are 1.4131 and 1633, respectively. These values differ from those determined from the measured values in FIGS. 2 and 3 since their temperature ranges in which the fitting is performed differ from each other.

As shown in FIGS. 2 to 8, the above-mentioned expression (2) can appropriately represent aged deterioration of an optical waveguide grating over a wide temperature range of 75° C. to 800° C. Also, parameter α included in expression (2) indicates Arrhenius-type of temperature dependence in this temperature range. Further, when aged deterioration of an optical waveguide grating is represented as expression (2), parameter C can be regarded as a constant value (1, in this embodiment) without temperature dependence at a temperature of 300° C. or lower. Accordingly, in this temperature range, normalized refractive index difference T may be represented in the form of:

$$\eta = t^{-\alpha} \quad (5)$$

By using expression (4), expression (5) can be modified as:

$$\eta = t^{-\alpha 0 \cdot exp(-E_\alpha / T)} \quad (6)$$

In some embodiments described below, expression (5) or (6) is used for predicting aged deterioration of an optical waveguide grating. The values of α0 and $E_\alpha$ used in the following are 2.7914 and 1963.2, respectively.

Figure 9:
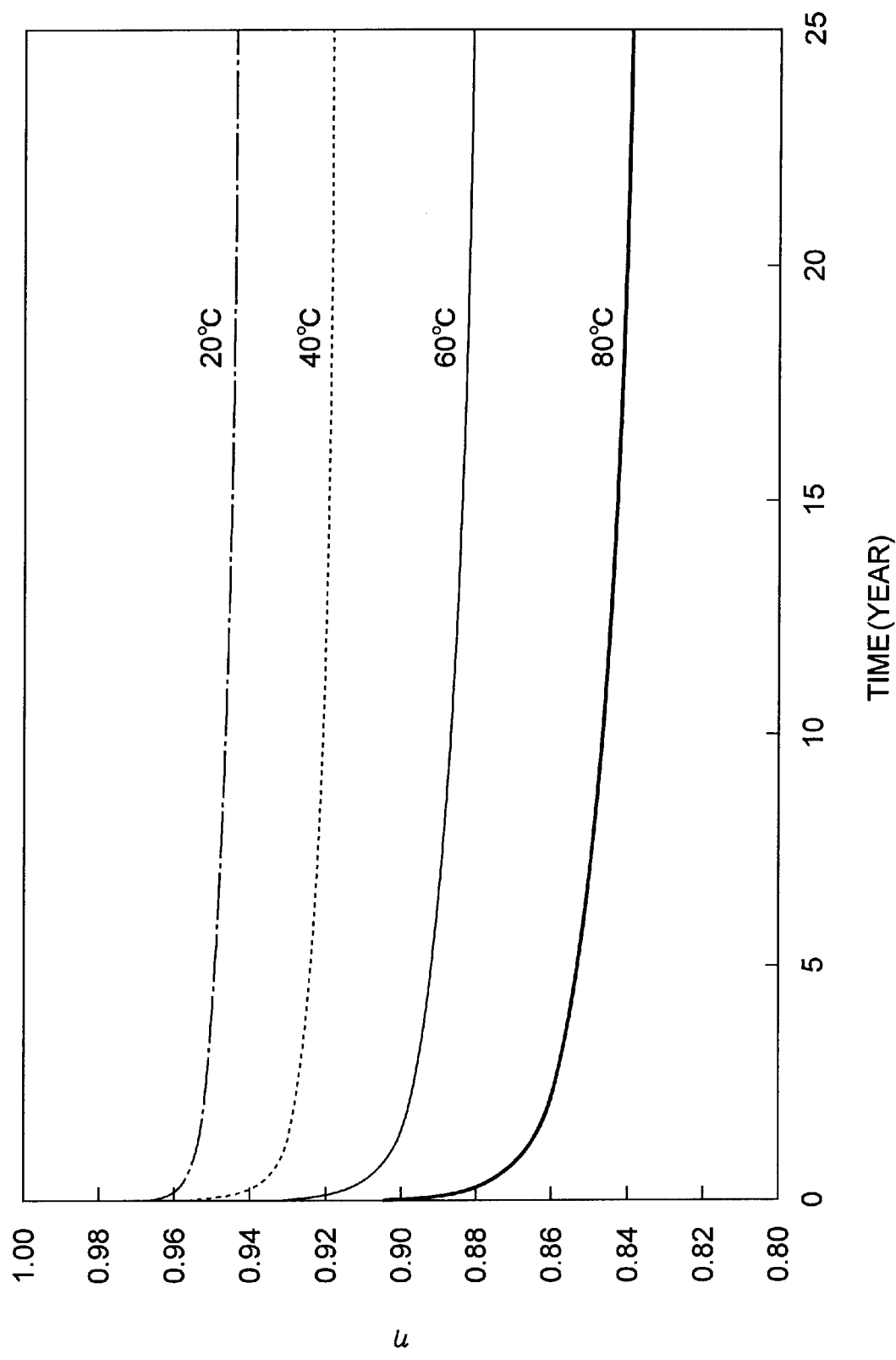
FIG. 9 is a graph showing predicted aged deterioration of normalized refractive index difference when no aging is effected.
Figure 10:
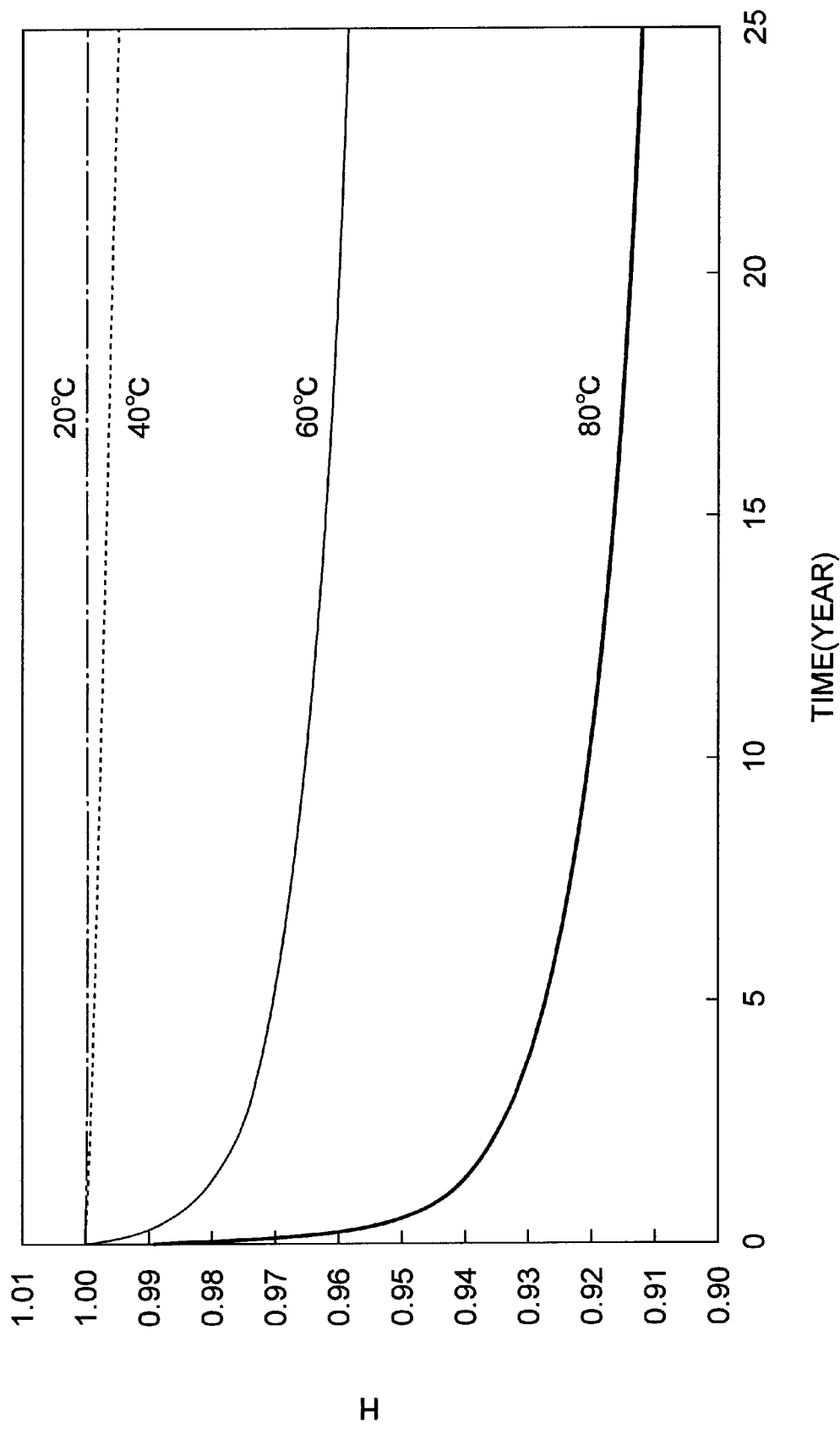
FIG. 10 is a graph showing predicted aged deterioration of normalized refractive index difference after the aging has been effected for 48 hours at a temperature of 80° C.

FIGS. 9 and 10 are graphs showing results of prediction of aged deterioration in normalized refractive index difference of gratings. This prediction is based on expression (6). Specifically, FIG. 9 is a graph showing the predicted aged deterioration in the normalized refractive index difference when no aging is effected. FIG. 10 is a graph showing the predicted aged deterioration in the normalized refractive index difference at various temperatures when the grating is subjected to heat treatment for aging at 80° C. for 48 hours and then maintained at those temperatures. Each graph shows the predicted aged deterioration at each temperature of 20° C., 40° C., 60° C., and 80° C. While the ordinate of the graph in FIG. 9 indicates the above-mentioned normalized refractive index difference η, the ordinate of the graph in FIG. 10 indicates a new normalized refractive index difference, H. The parameter H is normalized with respect to the refractive index difference at the point of time when the aging is completed. This parameter H will be explained later in greater detail.

Each line in FIG. 9 showing the predicted result of the aged deterioration when no aging is effected can be easily determined by substituting each temperature into the above expression (6). Explained in the following is how to derive the graphs in FIG. 10 showing the predicted results of the aged deterioration when the aging is effected.

Figure 11:
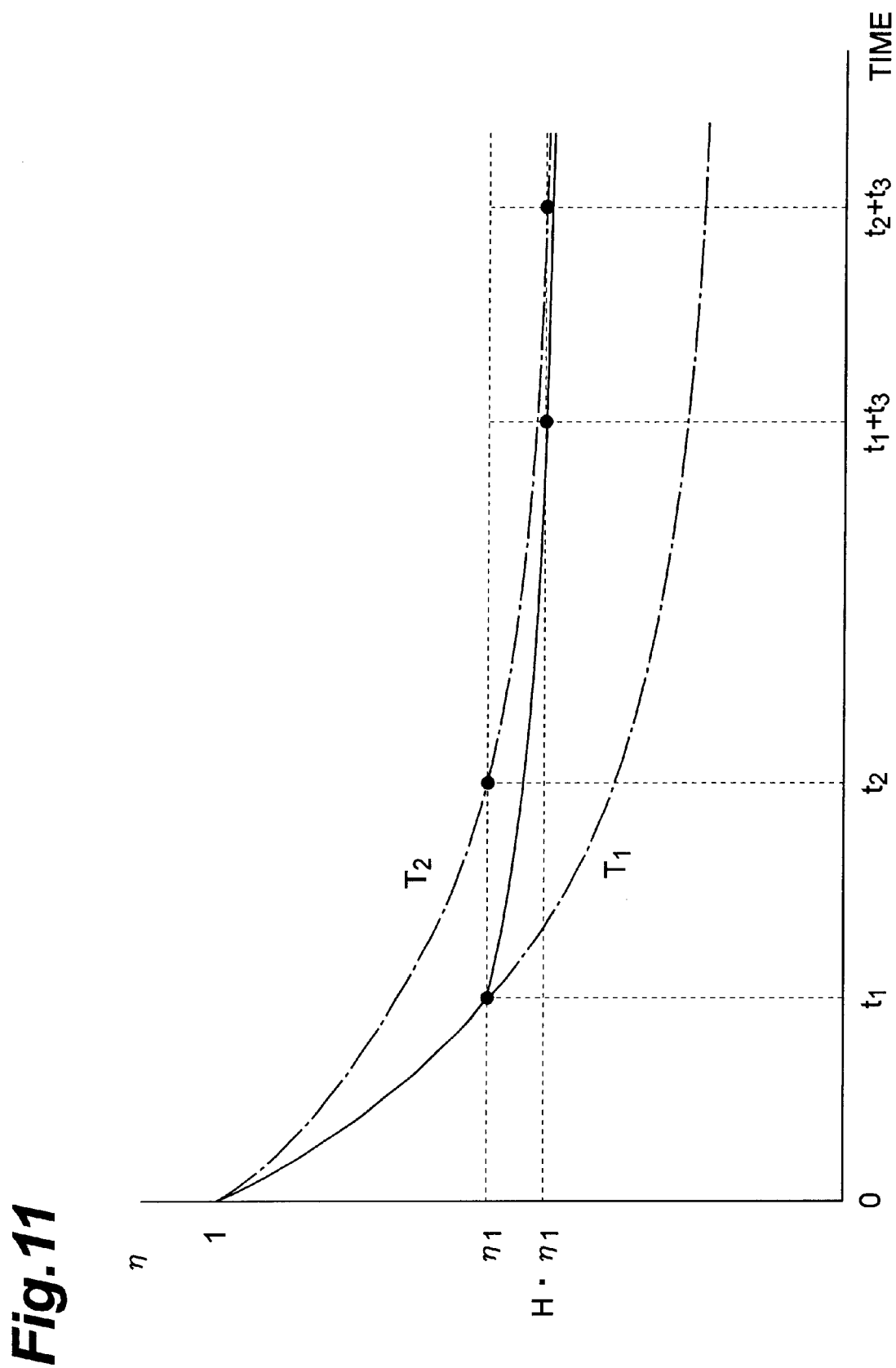
FIG. 11 is a diagram for explaining a method for predicting aged deterioration after aging has been effected.

FIG. 11 is a diagram for explaining a method for predicting the aged deterioration after aging has been effected. In this diagram, T1 indicates the heat-treatment temperature for the aging, and T2 indicates the operating temperature of the grating, i.e., the temperature at which the grating is used. The solid line in FIG. 11 shows the temporal change of normalized refractive index difference η when the grating is aged at the heating temperature of T1 and then is placed in an environment with the operating temperature of T2. On the other hand, the two chain lines in FIG. 11 show the predicted temporal changes of η according to expression (6) if the grating were placed in environments at temperatures T1 and T2, respectively.

First, the value of η at the point of time when the aging is completed (heating temperature T1=80° C. and heating time t1 =48 hr), η1, is determined. By using the following expression:

$$\eta 1 = t1^{-\alpha 0 \cdot exp(-E_\alpha / T1)} \quad (7)$$

which is based on expression (6), the value of η1 is computed as η1=0.92. Subsequently determined is time t2 required for η to become η1 if the grating were to be placed in an environment with operating temperature T2 after formation of the grating without the aging. The time t2 can be determined from the following expression:

$$t2 = \exp\left(-\frac{\ln(\eta 1)}{\alpha 0 \cdot \exp\left(\frac{-E_\alpha}{T2}\right)}\right) \quad (8)$$

This expression can be derived from the definition of time t2 and the above expression (7).

Prior to the point of time t1, the temporal change of η indicated by the solid line of FIG. 11 coincides with the temporal change at temperature T1. After the point of time t1, the curve representing temporal change has the same form as the curve representing temporal change at temperature T2 after η reaches η1, i.e., the curve for T2 to the right of time t2. Accordingly, the temporal change at temperature T2 after the point of time t2 can be predicted to obtain the graph in FIG. 10.

Here, a new parameter H is introduced that represents the refractive index difference normalized with respect to the refractive index difference at the completion of aging, and the value of H at the point of time when time period t2 and additional time period t3 have elapsed at temperature T2 is determined. This normalized refractive index difference H is also referred to as "refractive index difference parameter" in this specification, in order to distinguish it from η. Assuming the refractive index difference of the grating to be Δn, the value of the refractive index difference of the grating at the completion of the aging to be Δn1, and the value of the refractive index difference that is the basis of normalization for η to be Δn0, refractive index difference parameter H is represented by:

$$H = \Delta n / \Delta n 1 \quad (9)$$
$$= (\Delta n / \Delta n 0) / (\Delta n 1 / \Delta n 0)$$
$$= \eta / \eta 1$$

By using expressions (6) and (9), the value of H at the point of time when time period t2 and t3 have elapsed at temperature T2 is determined as:

$$H = \frac{1}{\eta 1} \cdot (t3 + t2)^{-\alpha 0 \exp(-E_\alpha / T2)} \quad (10)$$

FIG. 10 shows the relationship between time t3 and parameter H represented by this expression (10) with respect to each value of operating temperature T2 (=20° C., 40° C., 60° C., and 80° C., respectively). Thus the aged deterioration of the grating after the aging can be predicted.

As shown in FIG. 9, when no aging is effected, the normalized refractive index difference is expected to deteriorate by 4% or more due to the lapse of only 1 year even at a relatively low operating temperature of 20° C., and the aged deterioration becomes greater as the operating temperature is higher. By contrast, as shown in FIG. 10, it is predicted that the normalized refractive index difference after the aging does not substantially deteriorate even after the lapse of 25 years at the operating temperature of 20° C., and that the deterioration is only about 0.5% even after the lapse of 25 years at the operating temperature of 40° C. Accordingly, it can be seen that a sufficient reliability for the optical waveguide grating can be secured if the aging is effected. However, even if the aging (at 80° C. for 48 hours) is effected, at the operating temperature of 60° C., the deterioration after the lapse of 25 years is predicted to be about 4%, and at the operating temperature of 80° C., the deterioration after the lapse of 25 years is predicted to be about 9%. Thus, it is not appropriate to uniformly set the condition of the aging without considering the actual operating temperature and operating time of the optical waveguide grating.

Therefore, in the methods described hereinafter, one or more aging conditions (i.e., at least one of value η1 of the normalized refractive index difference at the completion of the aging, aging temperature T1, and aging time t1) is appropriately determined according to the above expression (2) or (5) in consideration of the operating temperature at which and operating time for which the optical waveguide grating is actually used. In the following, embodiments of a method for determining an aging condition will be specifically explained.

[First Embodiment for Determining a Condition]

The method in accordance with this embodiment aims to make an optical waveguide grating designed to suppress the decrease in refractive index difference parameter H within a predetermined tolerance when the grating is used for operating time t3 at operating temperature T2. Accordingly, the aging condition is determined so that the value of parameter H of the grating is not lower than a predetermined minimum allowable value, $H_m$, when the grating has been placed in an environment with operating temperature T2 for operating time t3. The operating temperature T2, operating time t3, and minimum allowable value $H_m$ has been determined previously in view of a use of the grating, an environment where it is used, and so forth.

In this method, the value η1 of the normalized refractive index difference at the completion of the aging is determined so as to satisfy both of the following two expressions:

$$H_m \leq \frac{1}{\eta 1} \cdot (t3 + t2)^{-\alpha 0 \exp(-E_\alpha/T2)} \quad (11a)$$

$$t2 = \exp\left(-\frac{\ln(\eta 1)}{\alpha 0 \cdot \exp\left(\frac{-E_\alpha}{T2}\right)}\right) \quad (11b)$$

The solutions of these expressions can be computed when operating temperature T2, operating time t3, and minimum allowable value $H_m$ are set.

Figure 12:
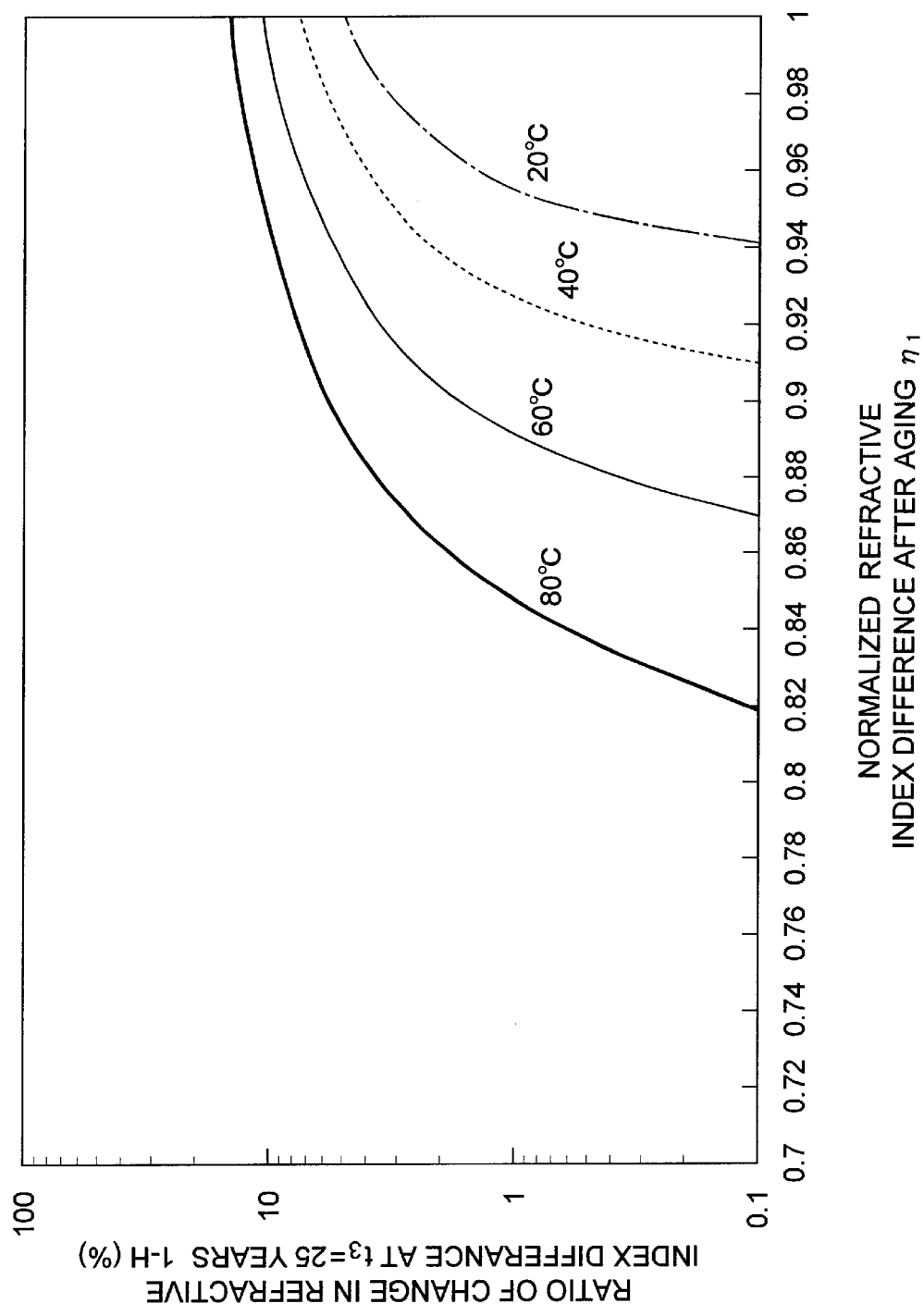
FIG. 12 is a graph showing, for each operating temperature, the relationship between value η1 of the normalized refractive index difference after aging and a ratio of change of refractive index difference due to the lapse of operating time t3.
Figure 13:
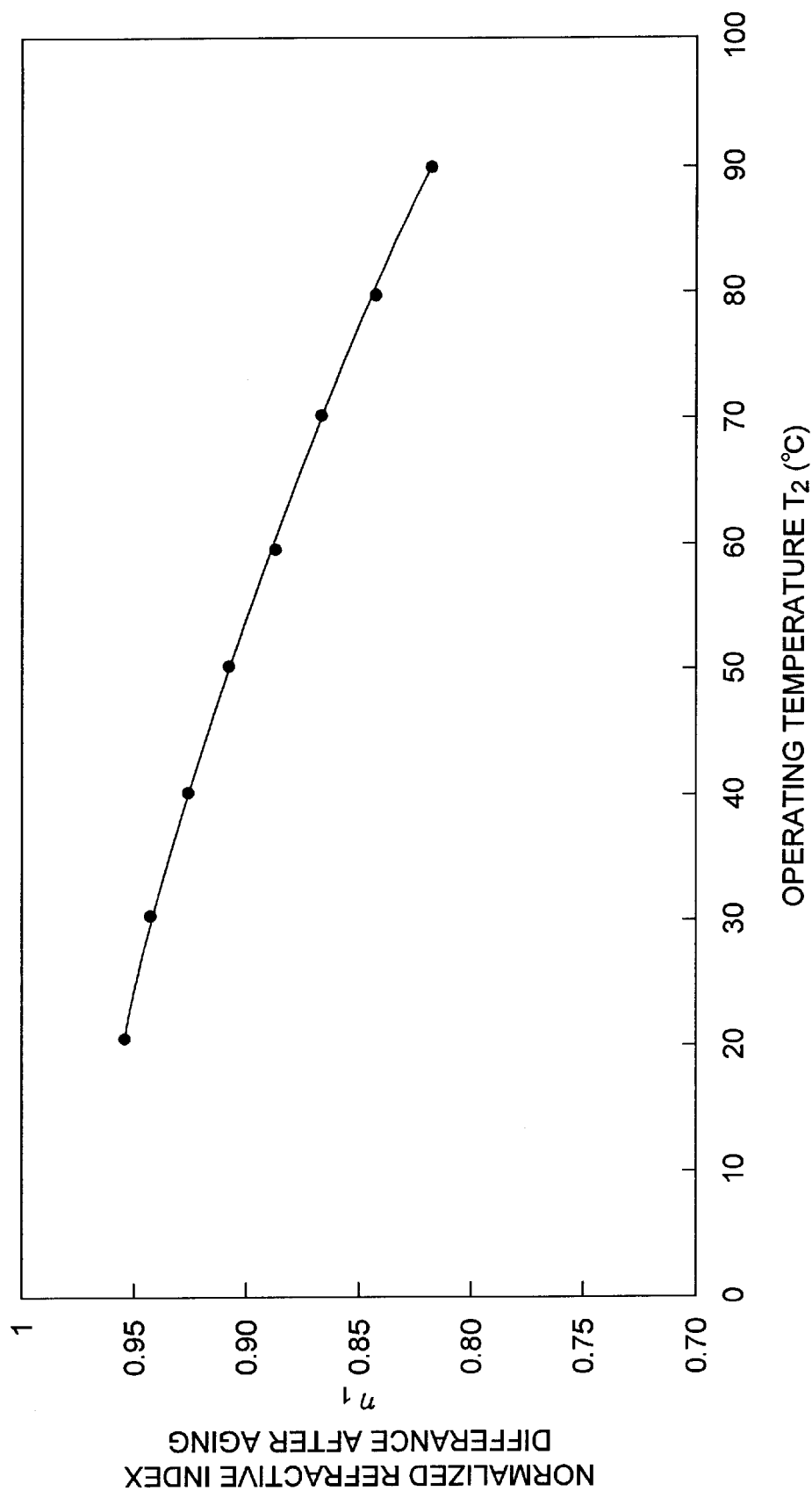
FIG. 13 is a graph showing value η1 of the normalized refractive index difference after aging, which is required for the ratio of change of refractive index (1-H) to be 1% or less if the operating time t3 is 25 years.

FIG. 12 a graph showing the relationship between the value η1 of normalized refractive index difference immediately after the aging and the ratio of the change of the refractive index difference due to the lapse of operating time t3 if operating time t3 is 25 years, for each value of operating temperature T2 (20° C., 40° C., 60° C., and 80° C., respectively). The ratio of the change in the refractive index difference, i.e., (Δn1−Δn)/Δn1, may be represented as (1−H) using the above parameter H. FIG. 13 is a graph showing the value of η1 required for the ratio (1−H) to be 1% or less if operating time t3 is 25 years, for each value of operating temperature T2.

As can be seen from those graphs, in order to achieve a generally required reliability standard (the standard is such that the ratio (1−H) is 1% or less, i.e., $H_m$=0.99 if operating time t3 is 25 years), it is necessary for the aging to be effected so that normalized refractive index difference at the completion of the aging, η1, is about 95.5% or less if the operating temperature is 20° C., about 92.5% or less if 40° C., about 89.0% or less if 60° C., and about 84.5% or less if 80° C., respectively.

In the foregoing manner, the value η1 of the normalized refractive index difference at completion of the aging, which is one of aging conditions, is determined dependent on operating temperature T2, operating time t3, and minimum allowable value $H_m$ of refractive index difference parameter H. The aging, such as heat treatment, of the grating can be effected till normalized refractive index difference η reaches the determined value η1 to obtain an optical waveguide grating in which the deterioration of the refractive index difference is suppressed within a predetermined tolerance under the conditions of operating temperature T2 and operating time t3.

Figure 14:
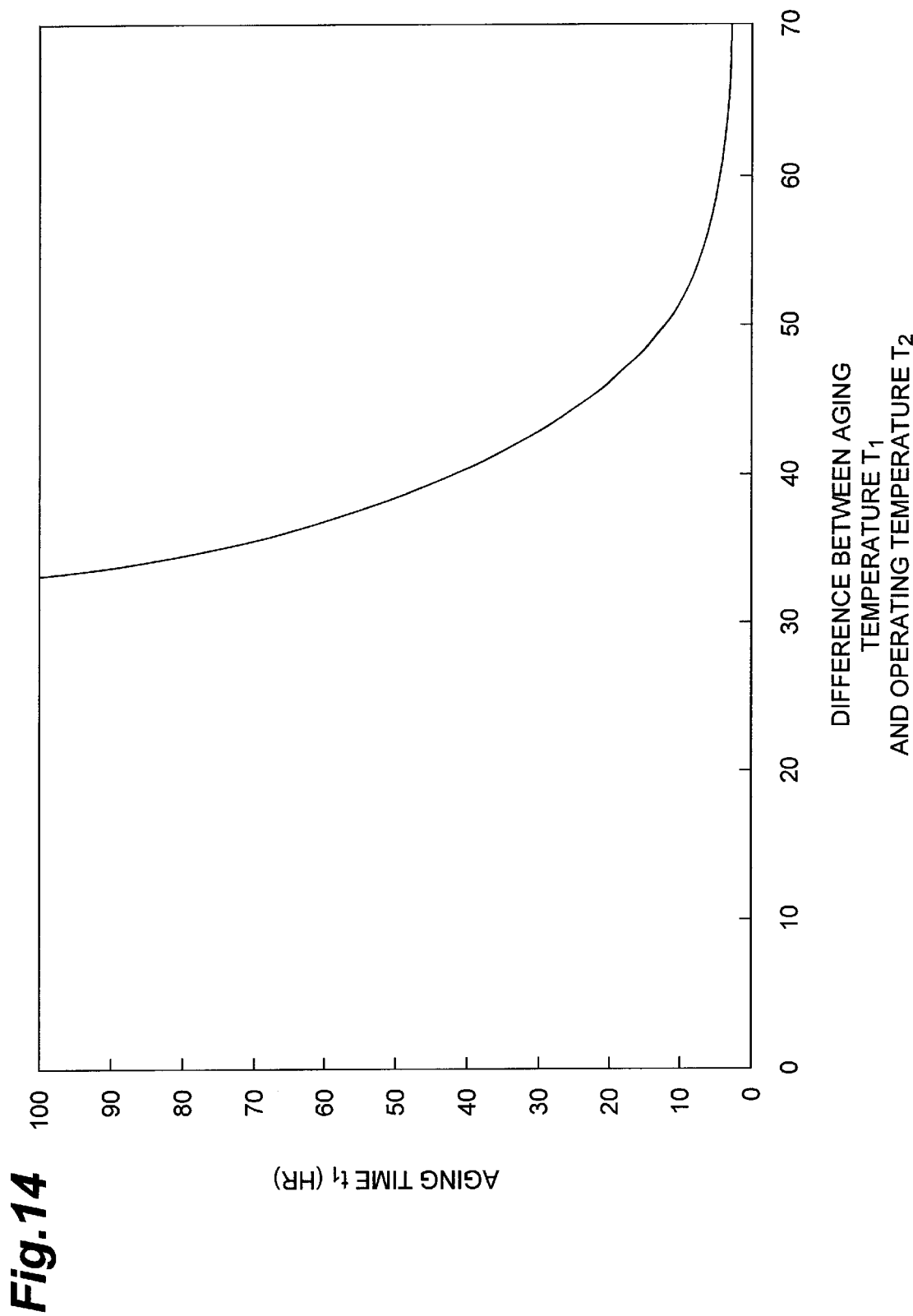
FIG. 14 is a graph showing the relationship between aging temperature T1 and aging time t1.

As more specific conditions of the aging, the temperature and time of the heat treatment for the aging can also be determined. Namely, aging temperature T1 and aging time t1 that can achieve the above determined η1 may be determined according to expression (7). In this case, aging temperature T1 and aging time t1 cannot be determined uniquely. FIG. 14 is a graph showing the relationship between aging temperature T1 and aging time t1; this relationship was determined according to expression (7). This graph indicates the relationship if operating time t3 is 25 years, operating temperature T2 is 20° C., and the allowable maximum ratio of the change in the refractive index difference is 1%. The ordinate of this graph indicates aging time t1, whereas abscissa indicates difference between aging temperature T1 and operating temperature T2, i.e., (T1−T2). As can be seen from this graph, the higher is aging temperature T1, the shorter becomes aging time t1. For example, if aging temperature T1 is 40° C. or more above operating temperature T2, aging time t1 is only 40 hours or less, as is preferable. Also if aging temperature T1 is 50° C. or more above operating temperature T2, aging time t1 is only 13 hours or less, as is more preferable.

[Second Embodiment for Determining a Condition]

In the following, another embodiment of a method for determining an aging condition based on expression (6) in accordance with the present invention will be explained. First, in this method, provisional values $T1_p$ and $t1_p$ for heating temperature T1 and heating time t1 are set. Subsequently predicted is value $\eta 1_p$ of the normalized refractive index difference at completion of the aging if the aging is effected at heating temperature $T1_p$ for heating time $t1_p$. Specifically, substituting $T1_p$ and $t1_p$ into expression (6) yields the predicted value $\eta 1_p$ as follows:

$$\eta 1_p = t1_p^{-\alpha 0 \cdot \exp(-E_\alpha/T1_p)} \quad (12)$$

Subsequently, time $t2_p$ required for normalized refractive index difference η to become the predicted value $T1_p$ due to the aged deterioration at operating temperature T2 is determined from the following expression:

$$t2_p = \exp\left(-\frac{\ln(\eta 1_p)}{\alpha 0 \cdot \exp\left(\frac{-E_\alpha}{T2}\right)}\right) \quad (13)$$

Then, assuming that the aging is effected at temperature $T1_p$ for time $t1_p$, the predicted value $H_p$ of parameter H of the grating that has been used for operating time t3 at operating temperature T2 after this aging is determined by use of the following expression:

$$H_p = \frac{1}{\eta l_p} \cdot (t3 + t2_p)^{-\alpha 0 \cdot \exp(-E_\alpha/T2)} \quad (14)$$

Thereafter, thus predicted value $H_p$ is compared with the minimum value $H_m$ of parameter H that is allowable under the conditions of operating temperature T2 and operating time t3. When $H_p \geq H_m$, $T1_p$, $\eta 1_p$ and $t1_p$, are judged to be appropriate aging conditions, whereby the process for determining the aging condition is completed. When $H_p < H_m$, by contrast, $\eta 1_p$ determined above is judged to be inappropriate, whereby provisional heating temperature $T1_p$ and provisional heating time $t1_p$ are reset. Preferably, this resetting operation is effected so that $\eta 1_p$ is made smaller to make predicted refractive index difference parameter $H_p$ greater. Thereafter, the steps mentioned above are repeated till appropriate $\eta 1_p$, $T1_p$ and $t1_p$ are determined.

In the first and second embodiments, only one parameter $\alpha$ dependent on temperature is used to express normalized refractive index difference $\eta$, as shown in expression (5) or (6), and thus an aging condition can be determined relatively easily.

[Third Embodiment for Determining a Condition]

Though the aged deterioration curve of an optical waveguide grating is represented by expression (6) in the embodiments described above, the inventors also propose to represent the aged deterioration curve as follows:

$$\eta = (t/\tau)^{-\alpha} = \tau^\alpha \cdot t^{-\alpha} \quad (15)$$

When this expression and the above-mentioned expression (2) are compared with each other, it can be seen that parameter C in expression (2) coincides with the nth power of parameter $\tau$ in expression (15). This parameter $\tau$ exhibits Arrhenius-type temperature dependence within a temperature range of 75° C. to 800° C. in which the inventors carried out measurements, same as parameter $\alpha$. Namely, $\tau$ can be expressed as follows:

$$\tau = \tau 0 \cdot \exp(-E_\tau/T) \quad (16)$$

where $\tau 0$ and $E_\tau$ are constants independent of temperature.

Figure 15:
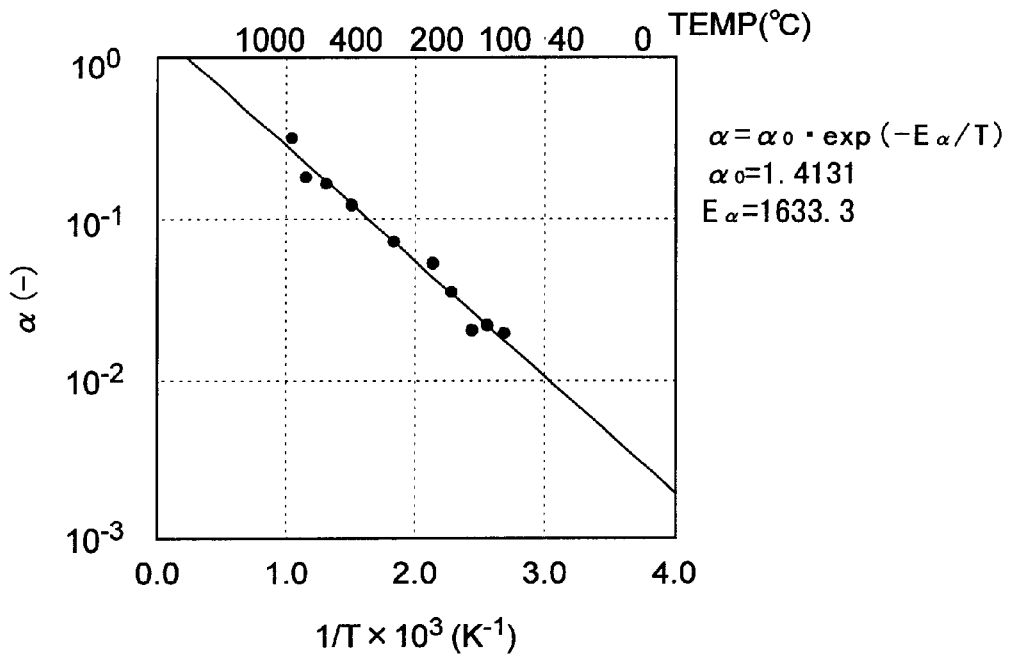
FIG. 15 is a graph showing the relationship between parameter $\alpha$ and temperature.
Figure 16:
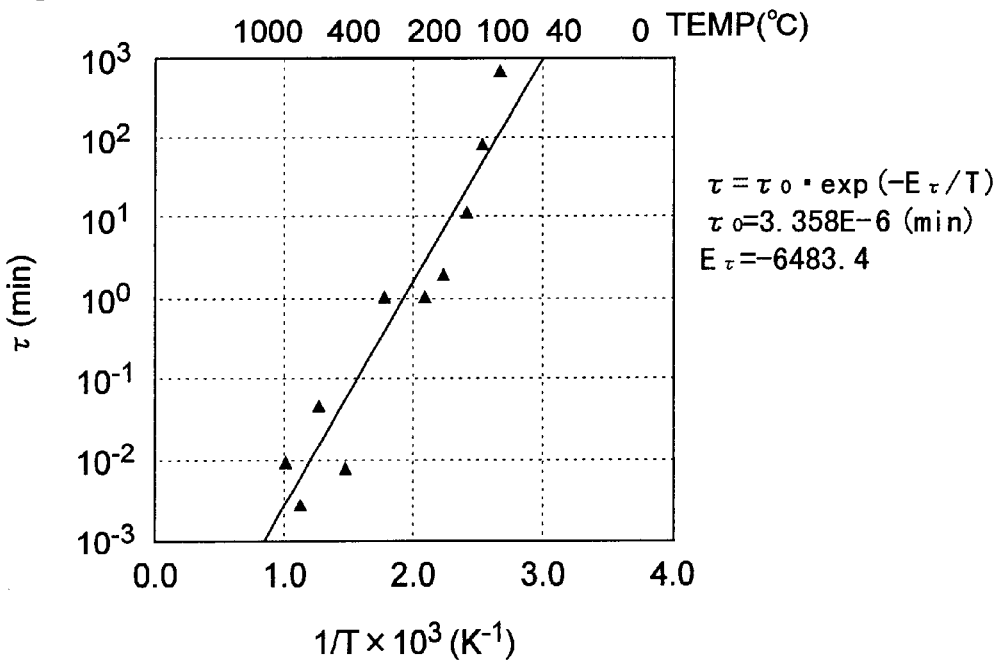
FIG. 16 is a graph showing the relationship between parameter $\tau$ and temperature.

As stated above, FIG. 15 is a graph showing the relationship between parameter $\alpha$ and temperature, and FIG. 16 is a graph showing the relationship between parameter $\tau$ and temperature. When aged deterioration of a grating is predicted using expression (15), the computation required may be more complicated than those in the above embodiments since both of two parameters $\tau$ and $\alpha$ have temperature dependence. Nevertheless, for example, if the optical waveguide grating is used in a high-temperature environment where it is inadequate to regard parameter C in expression (2) as a constant value, it is effective that the aged deterioration curve is determined as represented by expression (15). In addition, expression (15) is still simpler than expression (1) used in the prior art; therefore, an aging condition can be determined easily in comparison with the prior art.

Referring to FIG. 11 again, a method for predicting aged deterioration of a grating after aging using expression (15) will be described.

First, value $\eta 1$ of normalized refractive index difference at the point of time when the aging (heat treatment of heating temperature T1 and heating time t1) is completed is predicted. T1 can be determined using the following expression based on expression (15):

$$\eta 1 = \left(\frac{t1}{\tau_{T1}}\right)^{-\alpha_{T1}} \quad (17)$$

where $\tau_{T1}$ and $\alpha_{T1}$ are represented as follows based on (16) and (4), respectively:

$$\tau_{T1} = \tau 0 \cdot \exp\left(\frac{-E_\tau}{T1}\right) \quad (18)$$

$$\alpha_{T1} = \alpha 0 \cdot \exp\left(\frac{-E_\alpha}{T1}\right) \quad (19)$$

Subsequently determined is time t2 (see FIG. 11) required for $\eta$ to reach the above $\eta 1$ if the grating were to be placed in an environment with the operating temperature T2 after formation of the grating without the aging. The time t2 can be determined from the following expression:

$$t2 = \tau 0 \cdot \exp\left(\frac{-E_\tau}{T2} - \frac{\ln(\eta 1)}{\alpha 0 \cdot \exp\left(\frac{-E_\alpha}{T2}\right)}\right) \quad (20)$$

This expression can be derived from the definition of time t2 and the above expressions (4), (15) and (16).

By using expressions (9) and (4), (15) and (16), the value of refractive index difference parameter H at the point of time when time period t2 and t3 have elapsed at temperature T2 is represented as:

$$H = \frac{1}{\eta 1} \cdot \left[\frac{t3 + t2}{\tau 0 \cdot \exp(-E_\tau/T2)}\right]^{-\alpha 0 \cdot \exp(-E_\alpha/T2)} \quad (21)$$

As in the case of the first embodiment mentioned above, the method of this embodiment aims to make an optical waveguide grating designed to suppress the decrease in refractive index difference parameter H within a predetermined tolerance when the grating is used for operating time t3 at operating temperature T2. That is, the aging condition is determined so that the value of parameter H of the grating is not lower than a predetermined minimum allowable value, $H_m$, when the grating has been placed in an environment with operating temperature T2 for operating time t3. The operating temperature T2, operating time t3, and minimum allowable value $H_m$ has been determined previously in view of a use of the grating, an environment where it is used, and so forth. Therefore, the value $\eta 1$ of the normalized refractive index difference at the completion of the aging is determined so as to satisfy both of the following two expressions:

$$H_m \leq \frac{1}{\eta 1} \cdot \left[\frac{t3 + t2}{\tau 0 \cdot \exp(-E_\tau/T2)}\right]^{-\alpha 0 \cdot \exp(-E_\alpha/T2)} \quad (22a)$$

$$t2 = \tau 0 \cdot \exp\left(\frac{-E_\tau}{T2} - \frac{\ln(\eta 1)}{\alpha 0 \cdot \exp\left(\frac{-E_\alpha}{T2}\right)}\right) \quad (22b)$$

The solutions of these expressions can be computed when operating temperature T2, operating time t3, and minimum allowable value $H_m$ are set.

In the foregoing manner, the value $\eta 1$ of the normalized refractive index difference at completion of the aging, which is one of aging conditions, is determined dependent on operating temperature T2, operating time t3, and minimum allowable value $H_m$ of refractive index difference parameter H. The aging, such as heat treatment, of the grating can be effected till normalized refractive index difference η reaches the determined value η1 to obtain an optical waveguide grating in which the deterioration of the refractive index difference is suppressed within a predetermined tolerance under the conditions of operating temperature T2 and operating time t3.

As in the first embodiment, the temperature and time of the heat treatment for the aging may also be determined as more specific conditions of the aging. Namely, aging temperature T1 and aging time t1 that can achieve the above determined η1 may be determined according to expression (17). Aging temperature T1 and aging time t1 can not be determined uniquely, as stated above.

[Fourth Embodiment for Determining a Condition]

In the following, another embodiment of a method for determining an aging condition based on expression (15) will be explained. The relationship between this embodiment and the third embodiment corresponds to the relationship between the second and first embodiments. First, in this method, provisional values $T1_p$ and $t1_p$ for heating temperature T1 and heating time t1 are set, as in the second embodiment. Subsequently predicted is value $\eta 1_p$ of the normalized refractive index difference at completion of the aging if the aging is effected at heating temperature $T1_p$ for heating time $t1_p$. Specifically, substituting $T1_p$ and $t1_p$ into expressions (15), (4), and (16) yields the predicted value $\eta 1_p$ as follows:

$$\eta 1_p = \left[ \frac{t1_p}{\tau 0 \cdot \exp(-E_\tau / T1_p)} \right]^{-a0 \exp(-E_\alpha / T1_p)} \quad (23)$$

Subsequently, time $t2_p$ required for normalized refractive index difference η to reach the predicted value $\eta 1_p$ due to the aged deterioration at operating temperature T2 is determined from the following expression:

$$t2_p = \tau 0 \cdot \exp\left( \frac{-E_\tau}{T2} - \frac{\ln(\eta 1_p)}{a0 \cdot \exp\left(\frac{-E_\alpha}{T2}\right)} \right) \quad (24)$$

Then, assuming that the aging is effected at temperature $T1_p$ for time $t1_p$, the predicted value $H_p$ of parameter H of the grating that has been used for operating time t3 at operating temperature T2 after this aging is determined by use of the following expression:

$$H_p = \frac{1}{\eta 1_p} \cdot \left[ \frac{t3 + t2_p}{\tau 0 \cdot \exp(-E_\tau / T2)} \right]^{-a0 \exp(-E_\alpha / T2)} \quad (25)$$

The predicted value $H_p$ is compared with the minimum value $H_m$ of parameter H that is allowable under the conditions of operating temperature T2 and operating time t3. When $H_p \geq H_m$, $\eta 1_p$, $T1_p$, and $t1_p$ are judged to be appropriate aging conditions, whereby the process for determining the aging condition is completed. When $H_p < H_m$, by contrast, $\eta 1_p$ determined above is judged to be inappropriate, whereby provisional heating temperature $T1_p$ and provisional heating time $t1_p$ are reset. Preferably, this resetting operation is effected so that $\eta 1_p$ is made smaller to make predicted refractive index difference parameter $H_p$ greater. Thereafter, the steps mentioned above are repeated till appropriate $\eta 1_p$, $T1_p$, and $t1_p$ are determined.

Thus, aged deterioration of an optical waveguide grating can be predicted adequately in the third and fourth embodiments even if the grating is used in a high-temperature environment. Further, an aging condition can be determined relatively easily because the expression of the aged deterioration curve used in these embodiments is still simpler that that in the prior art.

[Embodiment for Making a Fiber with a Grating]

In the following, the method for making an optical fiber with a built-in grating in accordance with an embodiment of the present invention will be explained. Referring to FIG. 1, a silica-based optical fiber 10 having the core region doped with germanium dioxide ($SiO_2 + GeO_2$) is prepared in this method. In this embodiment, though the cladding region 14 of the optical fiber 10 is composed of substantially pure silica ($SiO_2$), $GeO_2$ may be doped to it. The optical fiber 10 is irradiated with an interference fringe formed by use of light 30 having a predetermined wavelength (e.g., wavelength shorter than 260 nm). This causes a refractive index change corresponding to the optical energy intensity distribution of the interference fringe in the optical fiber 10, whereby a grating 20 is formed. Thereafter, the grating 20 is subjected to heat treatment, so as to cause initial accelerated deterioration of the grating 20, thus performing the aging.

This heat treatment can be effected according to a condition or conditions determined by any of the above mentioned methods. For example, the grating 20 may be heat-treated, with normalized refractive index difference η of the grating 20 being monitored, till η reaches the value η1 (or $\eta 1_p$) determined according to the present invention. Alternatively, the heat treatment may be effected with the temperature T1 (or $T1_p$) and time t1 (or $t1_p$) determined according to the present invention. In this case, the heat treatment can be effected without monitoring normalized refractive index difference η. With respect to the grating 20 that has been subjected to such heat treatment, the decrease in refractive index difference parameter H is suppressed within a predetermined tolerance when the grating is used at operating temperature T2 for operating time t3. Upon completion of this heat treatment, the making of the optical fiber with the grating in accordance with this embodiment is completed.

Thus, according to the present invention, it is possible to yield an optical waveguide with a grating that suppress its aged deterioration within a predetermined tolerance at a predetermined operating temperature for a predetermined operating time and thereby has a desired reliability.

[Embodiment of the Temperature Sensor]

Figure 17:
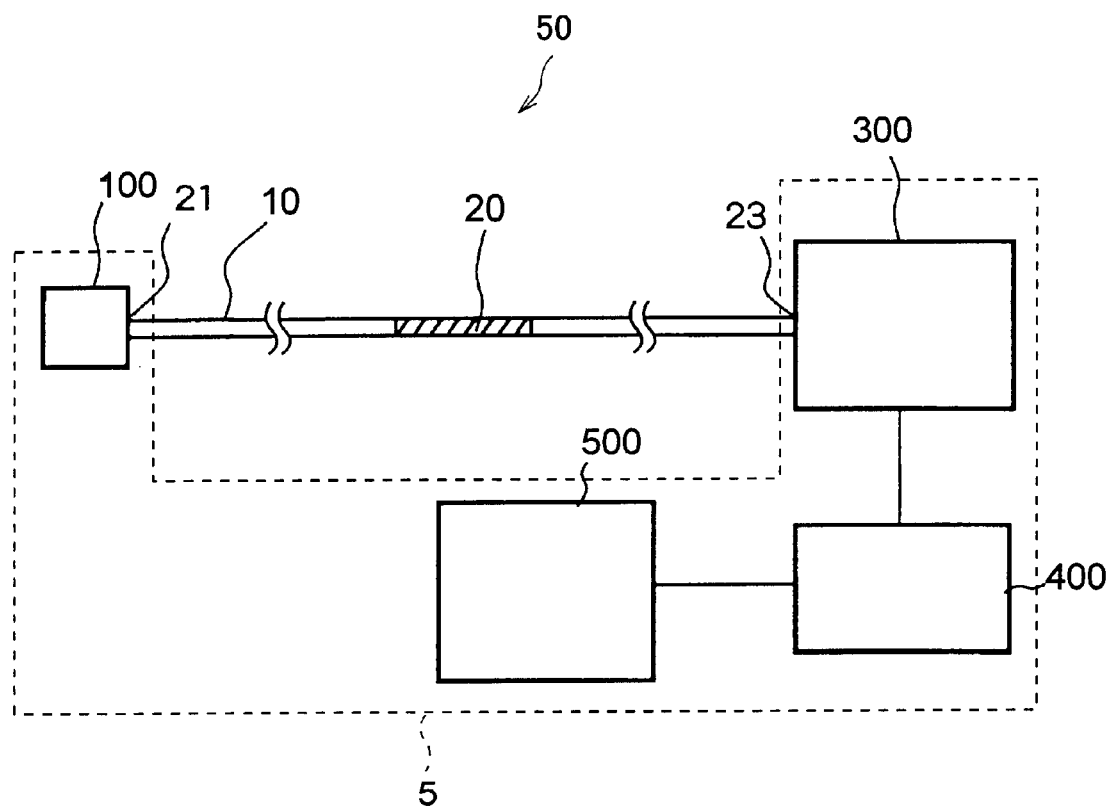
FIG. 17 is a schematic view showing an embodiment of a temperature sensor in accordance with the invention.

An embodiment of a temperature sensor in accordance with the present invention will be described in detail hereinafter. FIG. 17 is a view showing the construction of the sensor generally. The temperature sensor 50 in the FIG. 17 comprises an optical fiber 10 in which a Bragg grating 20 is built as a sensing section. The sensor 50 also comprises a spectrum detecting system 5 coupled to the optical fiber 10 to detect the spectrum of light transmitted through the Bragg grating 20.

The spectrum detecting system 5 comprises a light source 100, a spectrum analyzer 300, a computer 400, and a computer display device 500. The light source 100 is coupled optically to one end 21 of the optical fiber 10, thereby enabling the output light of the source 100 to enter the fiber 10. The optical fiber 10 is a single-mode fiber with a core having a circular cross section, and a Bragg grating is built in a portion 20 of the fiber 10. In this grating portion 20, some propagating light in the fiber 10 which has a narrow wavelength band centered on the Bragg wavelength is reflected. The light source 100 is adapted to emit light with a wavelength band including the Bragg wavelength. The other end 23 of the fiber 10 is coupled optically to the spectrum analyzer 300, thereby enabling light included in the output light of the source 100 and transmitted through the Bragg grating 20 to enter the analyzer 300. The computer 400 is coupled electrically to the analyzer 300 to transfer the output of the analyzer 300 to the computer 400. The computer display device 500 is coupled electrically to the computer 400 to display the result of the operation in the computer 400.

In the measurement of temperature by the sensor 50, light is emitted from the source 100 and the spectrum of the light transmitted through the grating 20 is detected by the analyzer 300. The detected data is transferred to the computer 400, and the computer 400 calculates the Bragg wavelength of the grating 20 based on the data. The computer 400 includes a hard disk drive storing a function that represents the previously measured temperature dependence of the Bragg wavelength. The computer 400 calculates the value of the Bragg wavelength and then substitutes the calculated value into the temperature dependence function to determine the temperature. The temperature value is displayed on the display device 500, thus informing users of the sensor of the measured value of the temperature.

In this embodiment, the sensor is adapted to determine the Bragg wavelength by detecting the spectrum of the transmitted light through the grating 20; however, the sensor may be adapted to determine the Bragg wavelength by detecting the spectrum of light reflected at the grating 20. More specifically, an optical coupler may be disposed between the end 21 and the grating 20 in the fiber 10 and the spectrum analyzer 300 may be coupled to the coupler rather than to the end 23 of the fiber. Also, computer 400 is coupled to the analyzer 300 and display device 500 is coupled to the computer 400, as in the embodiment shown in FIG. 17. Consequently, it will be possible to transmit the reflected light from the grating 20 into the analyzer 300 through the optical coupler and detect the spectrum of the reflected light in order to determine the Bragg wavelength.

The optical fiber grating 20 in this embodiment has been subjected to an accelerated aging process. As stated above, accelerated aging is a process that accelerates aged deterioration of an optical waveguide grating, typically by subjecting the grating to heat treatment after the grating has been formed. In general, the rate of aged deterioration at a point of time is more rapid nearer to the formation of the grating and becomes slower with time monotonically. Therefore, it will be possible to avoid rapid deterioration and stabilize the operating characteristics of the grating by forcing accelerated aging.

To effect accelerated aging of the grating 20, it is necessary to determine the condition or conditions, such as a temperature and time period for heat treatment, that will be used when the accelerated aging is to be performed. The aging condition is determined based on a method in accordance with the invention.

As described above, the following expression may be employed to represent temporal change in normalized refractive index difference $\eta$ of an optical waveguide grating:

$$\eta = C \cdot t^{-\alpha} \tag{26}$$

where t represents time, and C and $\alpha$ are parameters. $\alpha$ can be represented approximately by the following general expression:

$$\alpha = \alpha 0 \cdot \exp(-E_\alpha/T) \tag{27}$$

where $\alpha 0$ and $E_\alpha$ are constants independent of temperature.

As stated above, when aged deterioration of a grating is represented by expression (26), parameter C can be regarded as a constant value (1, in some embodiments) without temperature dependence at a temperature of 300° C. or lower (see FIG. 8). However, in the case where it is necessary to consider an environment in which the temperature is more than 300° C., taking parameter C as 1 is not appropriate. Thus, the inventors adopt parameter $\tau$ with a time dimension and use a representation of $C = \tau^\alpha$, in view of the fact that $\eta$ is a dimensionless parameter. That is:

$$\eta = (t/\tau)^{-\alpha} = \tau^\alpha \cdot t^{-\alpha} \tag{28}$$

As does parameter $\alpha$, parameter $\tau$ exhibits Arrhenius-type temperature dependence within a temperature range of 75° C. to 800° C. in which the inventors carried out measurements. Namely, $\tau$ can be expressed as follows:

$$\tau = \tau 0 \cdot \exp(-E_\tau/T) \tag{29}$$

where $\tau 0$ and $E_\tau$ are constants independent of temperature.

FIG. 15 is a graph showing the relationship between parameter $\alpha$ and temperature, and FIG. 16 is a graph showing the relationship between parameter $\tau$ and temperature. In these graphs, plotted points indicate the measured values of $\alpha$ and $\tau$, respectively, whereas solid lines are fitted to these measured values according to expressions (27) and (29), respectively. $\alpha 0 = 1.4131$ and $E_\alpha = 1633.3$ in FIG. 15, and $\tau 0 = 3.358e-6(\min)$ and $E_\tau = -6483.4$ in FIG. 16, where the measured values of $\tau$ is determined by measuring the values of $\alpha$ and C and utilizing the relationship of $C = \tau^\alpha$.

Thus, if a temperature sensor adapted to a high temperature environment in which parameter C cannot be regarded as a constant value adequately, it is effective to represent the aged deterioration curve of an optical waveguide grating as expression (28) to determine the aging condition. Consequently, in this embodiment, the aging condition is determined based on expression (28).

Referring to FIG. 11 again, a method will be described for predicting aged deterioration of an optical waveguide grating after accelerated aging has been effected by using expression (28). In this embodiment, T1 represents the heat treatment temperature for the accelerated aging, and T2 represents the upper limit of the operating temperature range of the temperature sensor, i.e., the maximum operating temperature. Here, T1>T2. The solid line in FIG. 11 shows the temporal change in normalized refractive index difference $\eta$ when the grating is aged at the heating temperature of T1 and then is placed in an environment with the maximum operating temperature of T2. On the other hand, the two chain lines in FIG. 11 show the predicted temporal changes of $\eta$ based on expressions (27)–(29) if the grating were placed in environments with temperatures T1 and T2, respectively.

First, value $\eta 1$ of normalized refractive index difference when the accelerated aging (heat treatment at the heating temperature T1 for the heating time t1) has been completed is predicted. $\eta 1$ can be determined using the following expression based on expression (28):

$$\eta 1 = \left(\frac{t1}{\tau_{T1}}\right)^{-\alpha_{T1}} \tag{30}$$

where $\tau_{T1}$ and $\alpha_{T1}$ are represented as follows based on (29) and (27), respectively:

$$\tau_{T1} = \tau 0 \cdot \exp\left(\frac{-E_\tau}{T1}\right) \quad (31)$$

$$\alpha_{T1} = \alpha 0 \cdot \exp\left(\frac{-E_\alpha}{T1}\right) \quad (32)$$

The time t2 (see FIG. 11) is subsequently determined. t2 is the time required for η to become η1 if the grating were to be placed in an environment with the maximum operating temperature T2 after formation of the grating without the aging. The time t2 can be determined from the following expression:

$$t2 = \tau 0 \cdot \exp\left(\frac{-E_\tau}{T2} - \frac{\ln(\eta 1)}{\alpha 0 \cdot \exp\left(\frac{-E_\alpha}{T2}\right)}\right) \quad (33)$$

This expression can be derived from the definition of time t2 and the above expressions (27)–(29).

Prior to the point of time t1, the temporal change of η indicated by the solid line in FIG. 11 coincides with the temporal change at temperature T1. After the point of time t1 (that is, after the aging), the curve representing temporal change has the same form as the curve representing temporal change at temperature T2 after η reaches η1, i.e., the curve for T2 to the right of time t2. Accordingly, the temporal change at temperature T2 between the points of time t2 and (t2+t3), where t3 is a guaranteed operating time of the temperature sensor, can be predicted to obtain the predicted temporal change of η when t3 has been elapsed at temperature T2 after the aging.

Therefore, δη, the temporal change of η, over the guaranteed operating time t3 at maximum operating temperature T2 can be represented using expression (28) as follows:

$$\delta\eta = \tau_{T2}^{\alpha T2} \cdot [t2^{-\alpha T2} - (t2+t3)^{-\alpha T2}] \quad (34)$$

where:

$$\tau_{T2} = \tau 0 \cdot \exp\left(\frac{-E_\tau}{T2}\right) \quad (35)$$

$$\alpha_{T2} = \alpha 0 \cdot \exp\left(\frac{-E_\alpha}{T2}\right) \quad (36)$$

Also, t2 is represented using expression (33). Using these expressions (34)–(36), the predicted value of δη can be obtained.

On the other hand, the following expression is obtained from the above expression (3):

$$\delta\eta = \delta(\Delta n)/\Delta n 0 \quad (37)$$

where δ(Δn) is temporal change of the refractive index difference Δn in the grating after the guaranteed operating time t3 at maximum operating temperature T2 has elapsed. In this embodiment, Bragg wavelength $\lambda_B$ is considered as follows:

$$\lambda_B = 2\Lambda \cdot (n + \Delta n) \quad (38)$$

where Λ is the period of the grating and n is the effective refractive index of an optical waveguide in which a grating is not yet formed. In this case, temporal change $\delta\lambda_B$ of Bragg grating $\lambda_B$ at a point of time when t3 has elapsed at temperature T2 is normalized using $\lambda_B(t=t2)$, the Bragg wavelength at point of time t2, as follows:

$$\frac{\delta\lambda_B}{\lambda_B(t=t2)} = \frac{2\Lambda(n+\Delta n)_{t=t2} - 2\Lambda(n+\Delta n)_{t=t2+t3}}{2\Lambda(n+\Delta n)_{t=t2}} \quad (39)$$

$$\cong \frac{\delta(\Delta n)}{n}$$

In this approximation, the facts that Δn is sufficiently smaller than n, in general, and that n may be regarded as substantially invariable are utilized. When expression (37) is combined with expression (39), the following expression is obtained:

$$\delta\lambda_B = \lambda_B(t=t2) \cdot \frac{\Delta n 0}{n} \cdot \delta\eta \quad (40)$$

The measured value of the temperature indicated by the sensor varies temporally due to $\delta\lambda_B$ because the temperature value is determined using the value of $\lambda_B$. In order to determine the amount of this temperature displacement, $\delta T_d$, corresponding to $\delta\lambda_B$ represented as expression (40), the temperature dependence of the Bragg wavelength of the grating may be measured after the completion of the aging and compared with $\delta\lambda_B$. More specifically, when the temperature dependence of the Bragg wavelength is represented as function $T_d = a\lambda_B$, where "a" is a constant, temperature displacement $\delta T_d$ can be represented as follows:

$$\delta T_d = a \cdot \delta\lambda_B \quad (41)$$

In this embodiment, an aging condition is determined so that temperature displacement $\delta T_d$ is no greater than temperature resolution $T_R$ of the sensor, that is, the following expression is satisfied:

$$\delta T_d \leq T_R \quad (42)$$

Applying expressions (40) and (41) to expression (42), the following expression:

$$\delta\eta \leq \frac{n}{\Delta n 0} \cdot \lambda_B(t=t2) \cdot \frac{T_R}{a} \quad (43)$$

is obtained. Each parameter included in the right side of expression (43) has a predetermined value or a value that can be previously measured. The right side of expression (43) is a threshold of δη, which will be represented as $\delta\eta_{th}$ hereinafter. As stated above, the threshold $\delta\eta_{th}$ has been determined so that the temperature displacement is no greater than the predetermined resolution of the sensor of the embodiment when the sensor is placed for the guaranteed operating time in an environment with the maximum operating temperature.

In this embodiment, a value of normalized refractive index at the completion of the aging, η1, that satisfies expression (43) is calculated to determine the aging condition. It should be noticed that the left side of expression (43) is represented using expressions (34)–(36) and t2 in expression (34) is represented as expression (33). Then, heat treatment for the accelerated aging of the grating is performed until normalized refractive index difference η reaches the calculated value η1, which can be accomplished by effecting heat treatment while monitoring η. Alternatively, the values of t1 and T1 may be determined using expression (30)–(32) so as to obtain the calculated value η1, and the heat treatment may be effected for a period of time and at a temperature having the determined values of t1 and T1, respectively. The optical waveguide grating subjected to such accelerated aging can be used to produce a temperature sensor with temporal temperature displacement no greater than its temperature resolution.

Thus, since the temperature sensor of the embodiment comprises the optical waveguide grating subjected to the above aging process as its sensing section, temperature displacement over the guaranteed operating time at the maximum operating temperature can be decreased to a value no greater than the temperature resolution, thereby keeping adequate precision during the guaranteed operating time. Further, since the accelerated aging condition to which the grating in the sensor has been subjected is determined using the aged deterioration curve represented with adequate accuracy by the above expression (28), the temperature displacement of the sensor will reliably be decreased to the value no greater than its temperature resolution.

The temperature sensor in accordance with the present invention should not be limited to the above embodiment and may have various modifications. For example, with respect to an optical waveguide with a coating as its surface, the coating of a portion including the grating in the waveguide may be removed to etch the surface of the waveguide in order to eliminate one or more scratches on the surface. If the coating has been removed at the formation of the grating, as shown in FIG. 1, the waveguide may be etched without removing the coating to eliminate the scratches. Thus, an optical waveguide with a grating from which one or more scratches on the surface is removed can be applied to the temperature sensor of the invention to decrease a risk of breakage of the waveguide due to thermal deformation in the case, for example, of a sensor being placed in an environment with varying temperature. Consequently, the optical waveguide can be used to produce the sensor with sufficient reliability even if a new coating is not provided with the waveguide.

With respect to the temperature sensor of the invention that is to be used at relatively high temperature, a coating of a portion including the grating in the optical waveguide may be made with a heat-resisting material. Materials used in a heat-resisting optical fiber and the like can be used, such as some metals and polyimide resin.

[Example of the Temperature Sensor]

The inventors heated an optical fiber grating with the reflectance of 99.999% at temperature of 600° C. for 24 hours to effect an accelerated aging process. As a result, the refractive index difference of the grating decreased, and the reflectance of the grating decreased to 30%. The inventors made the temperature sensor shown in FIG. 17 with the processed grating, and then placed the sensor in an environment with temperature no greater than the maximum operating temperature of 450° C. for the guaranteed operating time of 1 year. Displacement of the Bragg wavelength due to the temporal change of the grating was measured as 0.015 nm. Since the temperature dependence of the Bragg wavelength of an optical fiber grating is typically 0.01–0.025 nm/° C., the desired temperature resolution of no greater than 1.5° C. was obtained.

As described above in detail, the temperature sensor of the invention comprises an optical waveguide grating subjected to accelerated aging is used as the sensing section, and the aging condition is so determined that the temperature displacement of the sensor when used at the maximum operating temperature over the guaranteed operating time is no greater than the temperature resolution. Consequently, the temporal changes in the operating characteristics of the grating will be suppressed and the sensor can be operated with stability for a long time.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A temperature sensor having an operating temperature range, guaranteed operating time and temperature resolution, said temperature sensor comprising an optical waveguide with a grating as a sensing section, said grating having been subjected to accelerated aging under a predetermined condition, the condition being determined to provide a displacement of a measured temperature value due to aged deterioration of the grating that is no greater than the temperature resolution when the sensor is used for the guaranteed operating time at the maximum temperature in the operating temperature range, wherein the condition of the aging is determined using the aged deterioration curve of said grating represented by $C \cdot t^{-\alpha}$, where t represents time, and C and $\alpha$ represent parameters.

See the attached Appendix for the changes made to effect the above claim.

2. The temperature sensor according to claim 1, wherein parameter $\alpha$ is represented as follows:

$$\alpha = \alpha 0 \cdot \exp(-E_\alpha/T)$$

where:

$\alpha 0$ and $E_\alpha$ are constants; and

T is absolute temperature.

3. The temperature sensor according to claim 2, wherein parameter C is represented as follows:

$$C = \tau^\alpha = [\tau 0 \cdot \exp(-E_\tau/T)]^\alpha$$

where:

$\tau 0$ and $E_\tau$ are constants; and

T is absolute temperature.

4. A method for making an optical waveguide with a grating, said grating being designed to suppress deterioration of the grating within a predetermined tolerance when the grating is used for a predetermined operating time at a predetermined operating temperature, said method comprising:

forming a grating at a region in an optical waveguide; and aging said grating under a condition determined according to a method comprising:

setting an aged deterioration curve of said grating as a form of $C \cdot t^{-\alpha}$, where t represents time, and $\alpha$ and C represent parameters; and determining said condition based on said aged deterioration curve.

5. A method according to claim 4, wherein said parameter $\alpha$ is expressed as follows:

$$\alpha = \alpha 0 - \exp(-E_\alpha/T)$$

where:

$\alpha 0$ and $E\alpha$ are constants; and

T is absolute temperature.

6. A method according to claim 5, wherein said determining said condition further comprises determining a values $\eta 1$ satisfying the following two expressions:

where:

$$H_m \leq \frac{1}{\eta I} \cdot (t3 + t2)^{-\alpha 0 \exp(-E_\alpha/T2)}$$

$$t2 = \exp\left(-\frac{\ln(\eta I)}{\alpha 0 \cdot \exp\left(\frac{-E_\alpha}{T2}\right)}\right)$$

$H_m$ is a predetermined minimum allowable value;

T2 is the predetermined operating temperature of said grating; and t3 is the predetermined operating time of said grating.

7. A method according to claim 6, wherein said determining said condition further comprises determining a temperature T1 and a time t1 of a heat treatment included in the aging based on said value η1.

8. A method according to claim 7, wherein said heating temperature T1 and said heating time t1 are set so as to satisfy the following expression:

$$\eta 1 = t1^{-\alpha 0 \cdot \exp(-E_\alpha/T1)}.$$

9. A method according to claim 7, wherein said heating temperature T1 is 40° C. or more above said operating temperature T2.

10. A method according to claim 5, wherein said determining said condition comprises:

setting a provisional temperature $T1_p$ and a provisional time $t1_p$ of a heat treatment included in the aging;

using said temperature $T1_p$ and time $t1_p$ to determine value $\eta 1_p$ represented by the following expression:

$$\eta 1_p = t1_p^{-\alpha 0 \cdot \exp(-E_\alpha/T1_p)} \quad (12)$$

using said temperature $T1_p$ and time $t1_p$ to determine value $\eta 1_p$ to determine a time $t2_p$, represented by the following expression:

$$t2_p = \exp\left(-\frac{\ln(\eta 1_p)}{\alpha 0 \cdot \exp\left(\frac{-E_\alpha}{T2}\right)}\right)$$

where T2 is the predetermined operating temperature of said grating;

using thus determined time $t2_p$ and said value $\eta 1_p$ to determine a value $H_p$ represented by the following expression:

$$H_p = \frac{1}{\eta 1_p} \cdot (t3 + t2_p)^{-\alpha 0 \exp(-E_\alpha/T2)}$$

where t3 is the predetermined operating time of said grating; and comparing thus determined value $H_p$ with a predetermined minimum allowable value $H_m$, and defining said value $\eta 1_p$, temperature $T1_p$, and time $t1_p$ as said conditions of the aging when the comparison results in $H_p \geq H_m$.

11. A method according to claim 10, wherein said determining said condition comprises resetting said provisional temperature $T1_p$ and said provisional time $t1_p$ when said comparison results in $H_p < H_m$, and repeating said determining the value $\eta 1_p$, determining the time $t2_p$, determining the value $H_p$ and comparing $H_p$ with $H_m$.

12. A method according to claim 10, wherein said provisional temperature $T1_p$ is 40° C. or more above said operating temperature T2.

13. A method according to claim 5, wherein said parameter C is expressed as follows:

$$C = \tau^\alpha = [\tau 0 \cdot \exp(-E_\tau/T)]^\alpha$$

where $\tau 0$ and $E_p$ are constants; and

T is absolute temperature.

14. A method according to claim 13, wherein said determining said condition further comprises determining a value η1 satisfying the following two expressions:

$$H_m \leq \frac{1}{\eta I} \cdot \left[\frac{t3 + t2}{\tau 0 \cdot \exp(-E_\tau/T2)}\right]^{-\alpha 0 \exp(-E_\alpha/T2)}$$

$$t2 = \tau 0 \cdot \exp\left(\frac{-E_\tau}{T2} - \frac{\ln(\eta I)}{\alpha 0 \cdot \exp\left(\frac{-E_\alpha}{T2}\right)}\right)$$

where:

$H_m$ is a predetermined minimum allowable value;

T2 is the predetermined operating temperature of said grating; and t3 is the predetermined operating time of said grating.

15. A method according to claim 14, wherein said determining said condition further comprises determining a temperature T1 and a time t1 of a heat treatment included in the aging based on said value η1.

16. A method according to claim 15, wherein said heating temperature T1 and said heating time t1 are set to satisfy the following expression:

$$\eta 1 = \left[\frac{t1}{\tau 0 \cdot \exp(-E_\tau/T1)}\right]^{-\alpha 0 \exp(-E_\alpha/T1)}.$$

17. A method according to claim 13, wherein said determining said condition comprises:

setting a provisional temperature $T1_p$ and a provisional time $t1_p$ of a heat treatment included in the aging;

using said temperature $T1_p$ to determine a time $t2_p$ represented by the following expression:

$$\eta 1_p = \left[\frac{t1_p}{\tau 0 \cdot \exp(-E_\tau/T1_p)}\right]^{-\alpha 0 \exp(-E_\alpha/T1_p)}$$

using said value $\eta 1_p$ to determine a time $t2_p$ represented by the following expression:

$$t2_p = \tau 0 \cdot \exp\left(\frac{-E_\tau}{T2} - \frac{\ln(\eta 1_p)}{\alpha 0 \cdot \exp\left(\frac{-E_\alpha}{T2}\right)}\right)$$

where T2 is the predetermined operating temperature of said grating;

using thus determined time t2 p and said value $\eta 1_p$ to determine a value $H_p$ represented by the following expression:

$$H_p = \frac{1}{\eta 1_p} \cdot \left[ \frac{t3 + t2_p}{\tau 0 \cdot \exp(-E_\tau / T2)} \right]^{-\alpha 0 \exp(-E_\alpha / T2)}$$

where t3 is the predetermined operating time of said grating;

and comparing thus determined value $H_p$ with a predetermined minimum allowable value $H_m$, and defining said value $\eta 1_p$, temperature $\eta 1_p$, and time $t1_p$ as said conditions of the aging when the comparison results in $H_p \geq H_m$.

18. A method according to claim 17, wherein said determining said condition comprises resetting said provisional temperature $T1_p$ and said provisional time $t1_p$ when said comparison results in $H_p < H_m$, and repeating said determining the value $\eta 1_p$, determining the time t2p, determining the value $H_p$ and comparing $H_p$ with $H_m$.

* * * * *